United States Patent
Willi et al.

(10) Patent No.: US 12,442,761 B2
(45) Date of Patent: Oct. 14, 2025

(54) SENSOR ASSEMBLY FOR SPECTROSCOPICALLY DETECTING SUBSTANCES

(71) Applicant: Hamilton Bonaduz AG, Bonaduz (CH)

(72) Inventors: Spela Willi, Bonaduz (CH); Bernd Offenbeck, Regensburg (DE); Klaus Leckebusch, Masein (CH); Marco Giardina, Neuchâtel (CH); Dirk Schönfuss, Rähzüns (CH)

(73) Assignee: Hamilton Bonaduz AG, Bonaduz (CH)

( * ) Notice: Subject to any disclaimer, the term of this patent is extended or adjusted under 35 U.S.C. 154(b) by 299 days.

(21) Appl. No.: 18/034,422

(22) PCT Filed: Oct. 29, 2021

(86) PCT No.: PCT/EP2021/080145
§ 371 (c)(1),
(2) Date: Apr. 28, 2023

(87) PCT Pub. No.: WO2022/096397
PCT Pub. Date: May 12, 2022

(65) Prior Publication Data
US 2023/0384216 A1    Nov. 30, 2023

(30) Foreign Application Priority Data
Nov. 3, 2020 (DE) .................. 10 2020 128 973.1

(51) Int. Cl.
*G01N 21/31* (2006.01)
*G01N 21/85* (2006.01)

(52) U.S. Cl.
CPC ....... *G01N 21/314* (2013.01); *G01N 21/8507* (2013.01); *G01N 2021/8521* (2013.01)

(58) Field of Classification Search
CPC ............. G01N 21/314; G01N 21/8507; G01N 2021/8521; G01N 2021/775;
(Continued)

(56) References Cited

U.S. PATENT DOCUMENTS 10,876,968 B2    12/2020 Aigner et al.
11,486,820 B2    11/2022 Cai et al.
(Continued)

FOREIGN PATENT DOCUMENTS

DE    202004013614 U1 *  12/2004  ......... G01N 21/3577
DE    102019129922 A1    2/2021
(Continued)

OTHER PUBLICATIONS

English Translation of DE202004013614U1 Description (Year: 2004).*
(Continued)

*Primary Examiner* — Tarifur R Chowdhury
*Assistant Examiner* — Akbar H. Rizvi
(74) *Attorney, Agent, or Firm* — Rankin, Hill & Clark LLP

(57) ABSTRACT

A spectroscopic sensor assembly for detecting at least one predefined analyte constituent of a measurement fluid, the sensor assembly including a sensor housing; a radiation source; a detector device; a barrier assembly, which is transmissive for measurement radiation and is impermeable to the analyte constituent; a polymer matrix, which absorbs and releases the analyte constituent; a reflector assembly, which has a signal side facing the polymer matrix and facing the barrier assembly; the reflector assembly has a passage extending through the reflector assembly, through which passage the analyte constituent is exchanged between a measurement environment and the polymer matrix, which polymer matrix is located on the signal side of the reflector (Continued)

assembly; the reflector assembly reflects incident measurement radiation back toward the apparatus portion; the sensor assembly having a spacing means different from the polymer matrix that is designed to prevent the reflector assembly from approaching the barrier assembly.

23 Claims, 8 Drawing Sheets

(58) Field of Classification Search
CPC ......... G01N 2021/7786; G01N 21/643; G01N 2021/4709; G01N 2021/4742; G01N 2021/4769; G01N 2021/6432; G01N 2021/6439; G01N 2021/773; G01N 21/274; G01N 21/3504; G01N 21/3577; G01N 21/4738; G01N 21/6408; G01N 21/77; G01N 21/7703; G01N 21/7746; G01N 21/80; G01N 2201/06; G01N 2201/105; G01N 31/22; G01N 21/64; G01N 21/00; G01N 21/01; G01N 21/17; G01N 21/84
See application file for complete search history.

(56) References Cited

U.S. PATENT DOCUMENTS

| | | |
|---|---|---|
| 2002/0072657 A1 | 6/2002 | Bousquet et al. |
| 2007/0102639 A1* | 5/2007 | Cutler ................. G01N 21/3504 250/339.13 |
| 2009/0190125 A1 | 7/2009 | Foster et al. |
| 2012/0080587 A1* | 4/2012 | Lievois ................. G01N 21/314 250/269.1 |
| 2017/0160193 A1* | 6/2017 | Gorritxategi Arrondo .................. G01N 21/01 |
| 2018/0313691 A1* | 11/2018 | Simpkin ............... G01J 3/0297 |
| 2020/0225126 A1* | 7/2020 | Sur .................... G01N 21/8507 |
| 2021/0055229 A1 | 2/2021 | Löbbert |

FOREIGN PATENT DOCUMENTS

| | | | |
|---|---|---|---|
| EP | 2887054 A1 | 6/2015 | |
| FR | 3059770 A1 * | 6/2018 | ............. B65D 25/54 |

OTHER PUBLICATIONS

English Translation of FR3059770A1 Description (Year: 2018).*
International Preliminary Report On Patentability for corresponding PCT/EP2021/080145 mailed May 8, 2023, 7 pgs.
German Search Report for corresponding DE 10 2020 128 973.1 mailed May 11, 2021, 8 pgs.
International Search Report for corresponding PCT/EP2021/080145 mailed Feb. 11, 2022, 15 pgs.
Espacenet Bibliographic data: DE 202004013614 (U1), Published Nov. 18, 2004, 1 pg.
Espacenet Bibliographic data: FR 3059770 (A1), Published Jun. 8, 2018, 1 pg.
Espacenet Bibliographic data: DE 102019129922 (A1), Published Feb. 25, 2021, 1 pg.
Espacenet Bibliographic data: EP 2887054 (A1), Published Jun. 24, 2015, 1 pg.

* cited by examiner

SENSOR ASSEMBLY FOR SPECTROSCOPICALLY DETECTING SUBSTANCES

This application claims priority in PCT application PCT/EP2021/080145 filed on Oct. 29, 2021, which claims priority in German Patent Application DE 10 2020 128 973.1 filed on Nov. 3, 2020, which are incorporated by reference herein.

The present invention concerns a spectroscopic sensor assembly for detecting at least one predetermined analyte constituent of a measurement fluid, where the sensor assembly comprises:
- A sensor housing with an instrument section and a specimen section;
- A radiation source which is arranged in the instrument section and is configured to emit in the direction towards the specimen section electromagnetic measurement radiation which interacts with the at least one predetermined analyte constituent;
- A detector device which is arranged in the instrument section and is configured to detect electromagnetic radiation radiating in the direction from the specimen section;
- A barrier arrangement which is transparent to the measurement radiation and impermeable to the at least one predetermined analyte constituent, where the barrier arrangement is arranged between the instrument section and the specimen section;
- A polymer matrix which is arranged in the specimen section and is configured to take up and to release again the at least one analyte constituent;
- A reflector assembly which is arranged in the specimen section with a signal side facing towards the polymer matrix and towards the barrier arrangement and with a fluid side opposite to the signal side;

Where the reflector assembly exhibits at least one passage penetrating through it through which during normal measurement operation of the sensor assembly there takes place an exchange of the at least one analyte constituent between an external measurement environment on the fluid side of the reflector assembly which during normal measurement operation contains the measurement fluid and the polymer matrix situated on the signal side of the reflector assembly, where the reflector assembly is configured and arranged to reflect measurement radiation radiating onto its signal side from the instrument section through the polymer matrix back in the direction towards the instrument section.

BACKGROUND OF THE INVENTION

Such a sensor assembly is known from DE 20 2004 013 614 U1. The known sensor assembly serves, as does preferably also the sensor assembly of the present invention, for ascertaining an analyte constituent, preferably $CO_2$, of a measurement fluid through non-dispersive infrared spectrometry, also referred to in the scientific community in brief as 'NDIR' spectroscopy.

An underlying measurement principle of the present invention utilizes as an interaction between the analyte constituent and the measurement radiation via absorption by the analyte constituent of electromagnetic radiation of a particular wavelength or of a particular wavelength range. The analyte constituent, which usually is dissolved physically in the measurement fluid, can diffuse via diffusion processes from the measurement environment into the polymer matrix, where depending on its concentration it absorbs electromagnetic measurement radiation of a particular wavelength, whereas electromagnetic reference radiation of a different wavelength as a reference wavelength passes without absorption into the polymer matrix which is enriched with the analyte constituent. By comparing characteristic radiation properties, such as for example the intensity, of the reference radiation received by the detector device with those of the absorption-impacted measurement radiation received by the detector device, ascertaining the presence of the analyte constituent in the measurement fluid, given a suitable process control of the measurement operation, also permits the concentration of the analyte constituent in the measurement fluid to be ascertained. To this end, once the sensor assembly section with the polymer matrix has been exposed to the measurement environment, usually there is a wait for some time until the fraction of analyte constituent which has diffused into the polymer matrix and the analyte constituent in the measurement fluid are in equilibrium.

In the present application, the at least one 'analyte constituent' denotes the at least one constituent out of several constituents which is to be detected with the sensor assembly. The predetermination of the analyte constituent takes place through the setting up of the radiation source and the detector device to emit and to receive electromagnetic radiation which is modified through interaction with the analyte constituent, for example through absorption. The choice of the material of the polymer matrix also contributes to predetermining the analyte constituent detectable through the present sensor assembly, since the molecules of the analyte constituent have to be able to diffuse into the polymer matrix and diffuse out of it again.

The barrier arrangement, in DE 20 2004 013 614 U1, a component made of sapphire glass, separates physically the instrument section of the sensor housing which accommodates the radiation source and the detector device from the specimen section, which at least in part is situated in the external measurement environment and therefore comes into contact with the measurement fluid. The barrier arrangement prevents an analyte constituent which has diffused into the polymer matrix from reaching a space in the instrument section in which the radiation source and the detector device are situated. Thereby it is ensured that only the quantity of analyte constituent taken up by the polymer matrix modifies the measurement radiation emitted by the radiation source and detected by the detector device after passage through the polymer matrix, reflection at the reflector assembly, and repeat passage through the polymer matrix.

The reflector assembly reflects the fractions of the reference radiation and of the measurement radiation impinging on it back to the instrument section, where they can be detected by the detector device. The reflector assembly serves for competing technical objectives and therefore represent a compromise between these objectives: On the one hand, its reflective surface should be as large as possible in order to be able to reflect the largest possible fraction of measurement radiation back into the instrument section accommodating the detector device. On the other, the at least one passage penetrating through it should exhibit the largest possible area in order to achieve in the polymer matrix the shortest possible response times of the sensor assembly to a changing concentration of the analyte constituent in the measurement environment. The larger the passage cross-sectional area of the reflector assembly, the larger the exchange area of the polymer matrix over which molecules of the analyte constituent can diffuse from the polymer matrix into the measurement environment and/or from the measurement environment into the polymer matrix. Here, an enlargement of the passage cross-sectional area means a reduction in the size of the area useful for reflection and vice versa.

Other spectroscopic sensor assemblies reflecting measurement radiation are known from WO 2019/074442 A1 or from EP 2 887 054 A. These known sensor assemblies too, work according to the NDIR principle.

In the sensor assembly known from DE 20 2004 013 614 U1, the reflector assembly is configured as a metal grating or as consisting of metal particles. Where configured as a metal grating, the reflector assembly of the known sensor assembly is applied directly on the polymer matrix and is carried by it.

The spectroscopic reflection sensor assemblies being discussed here are brought into contact with various measurement fluids during their service life in order to detect, normally in a quantified manner, an analyte constituent in the respective measurement fluid present. This makes cleaning of the sensor assemblies necessary between their deployments. Especially advantageous, i.e., rapid and secure, cleaning processes require heating of at least the specimen section of the sensor assembly to significantly above 100° C., for instance to 140° C., as is the case in sterilization-in-place or 'SIP' in brief sterilization processes and/or clean-in-place or 'CIP' in brief cleaning processes. At the temperatures which occur during CIP cleaning, the polymer matrix as the substrate carrying the reflector assembly can soften thermally, whereby the position of the reflector assembly relative to the radiation source and/or to the detector device can change. With such a change in the relative position of the reflector assembly, however, the detection characteristics of the sensor assembly change overall. The consequence of this can be that results obtained with the sensor assembly before such a cleaning process are no longer comparable with results after the cleaning process.

SUMMARY OF THE INVENTION

It is, therefore, the task of the present invention to improve the sensor assembly mentioned at the beginning in such a way that it is and remains reliably deployable across thermal stresses in general and preferably in the region from 100° C. to 150° C., in particular across SIP sterilization processes and/or CIP cleaning processes.

The present invention solves this task in the sensor assembly mentioned at the beginning by having the sensor assembly exhibit a spacing-securing means different from the polymer matrix, configured to prevent an approach of the reflector assembly to the barrier arrangement.

Through the spacing-securing means, which can be designed in a variety of ways, the distance decrease described above is prevented through sinking of the reflector assembly into the softened polymer matrix and thereby constant detection characteristics of the sensor assembly achieved even after heating the polymer matrix.

The spacing-securing means is formed from adequately temperature-resistant material, such as preferably metal, in particular stainless steel, and/or a metal alloy, and/or from a synthetic which does not soften up to at least 200° C., such as for example polyphenyl sulfone, polyether ether ketone (PEEK), polyimide, polyethylene terephthalate, or polytetrafluorethylene and/or from glass and/or from a mineral, such as for example sapphire glass.

Preferably the spacing-securing means prevents not only an approach of the reflector assembly to the barrier arrangement and thereby to a radiation module comprising the radiation source and the detector device, but also prevents an increase in the distance of the reflector assembly from the barrier arrangement. Especially preferably, the spacing-securing means fixes the reflector assembly relative to the barrier arrangement and/or relative to the radiation module and prevents translatory and rotatory relative movements between the reflector assembly and the barrier arrangement and/or the radiation module.

According to a first preferred embodiment, the spacing-securing means can exhibit an abutting section provided at the reflector assembly which is in abutting engagement which prevents an approach of the abutting section to the barrier arrangement with a counter-abutting section connected rigidly with the sensor housing. The counter-abutting section can exhibit a counter-abutting surface which faces away from the barrier arrangement for planar contact with an abutting surface of the abutting section. The counter-abutting surface does not have to face exclusively away from the barrier arrangement, but rather can also exhibit an aligning component orthogonally to the direction facing away from the barrier arrangement, for instance in order to be able to center the reflector assembly relative to the component carrying the counter-abutting section. The abutting- and the counter-abutting section can comprise the materials mentioned above for the spacing-securing means, preferably stainless steel, or be made from them.

The counter-abutting section with the counter-abutting surface can be configured integrally at the sensor housing, for instance through a set-off or a shoulder. Alternatively, the counter-abutting section can be configured through a counter-abutting component configured separately from the sensor housing, where the counter-abutting component is preferably fixed at the sensor housing, for instance through gluing, soldering, welding, thus through firm bonding, and/or through the arrangement of a counter-abutting component in an aperture or recess at the sensor housing with a press fit, i.e., through a force-fit connection.

The sensor housing is a tubular sensor housing preferably completely or at least in a region exhibiting both the specimen section and at least a part of the instrument section.

The tubular sensor housing extends along a housing axis which is also a tube axis of the tubular sensor housing. Preferably the specimen section then reaches up to a longitudinal end of the tubular sensor housing. With this longitudinal end, the sensor housing is exposed to the measurement environment with the measurement fluid. The environment of the longitudinal end comprising the specimen section or of the longitudinal end of the sensor housing lying nearer to the specimen section is always referred to in the present application as 'measurement environment', even if between two measurement operations it is completely free from measurement fluid.

The measurement fluid can be a liquid, a gas, or a paste.

When the sensor housing is the preferable tubular sensor housing, the counter-abutting surface of the counter-abutting section can face predominantly or completely in the direction of the housing axis. For possible centering of the reflector assembly with respect to a spatial region surrounded by the sensor housing, the counter-abutting surface can have a radial component towards the housing axis conceived as penetrating centrally through the sensor housing or, less preferably, away from the housing axis.

In term of the present application, a surface or a surface section faces in the direction towards which its normal vector is pointing.

The reflector assembly is preferably configured with low weight, for instance through very thin configuration of the reflector assembly. Noble metals such as for example gold, silver, platinum, or stainless steels, preferably 1.4310 or 1.4404 or also self-passivating metals, have proved to be especially robust materials which are both resistant to numerous measurement fluids and reflect electromagnetic radiation well in a relevant wavelength range. The reflector assembly can, therefore, at least on its reflective signal side but preferably completely, comprise gold, silver, platinum, palladium, high-alloyed stainless steels, titanium, aluminum, copper and the like or be made from at least one of these materials. Due to the low material cost with at the same time high chemical resistance and high component strength, the reflector assembly comprises at least on its reflective signal side, preferably from the signal side up to the fluid side, stainless steel. The reflector assembly can be coated with a noble metal, in particular with gold, in order to increase its reflectivity on its reflective signal side. Very good reflection yield is achieved with a polished metal surface, preferably stainless steel. Often, however, a cost-effective ordinary stainless steel surface, for instance one obtained through rolling, can already suffice.

The fluid side faces away from the barrier arrangement and during normal measurement operation of the sensor assembly faces towards a measurement environment containing the measurement fluid.

In order to achieve low weight with at the same time the largest possible reflective surface, the reflector assembly preferably exhibits a disc-like shape. The reflector assembly is preferably no thicker than 200 µm, especially preferably no thicker than 160 µm. In order to confer on the reflector assembly adequate stiffness and/or stability as applicable, preferably it is no thinner than 60 µm, especially preferably no thinner than 40 µm.

With a disc-like shape, the abutting section can be configured in an edge region of the disc-like reflector assembly such that a central region of the reflector assembly as a potentially reflective surface remains unaffected by the configuration of the abutting section.

In principle, the completely surrounding edge region of the disc-like reflector assembly can be configured as an abutting section, which for example abuts against a continuous or discontinuous surrounding counter-abutting section. However, it suffices if an abutting section is configured in at least one angular sector in the edge region of the reflector assembly. An abutting section configured only in at least one angular sector of the edge region of the reflector assembly can for example be configured as a projecting section projecting radially outward from the reflector assembly, for instance as a projecting tongue, protrusion, and the like.

In order to immobilize the reflector assembly not only in the direction of an approach to the barrier arrangement but also in the opposite direction, according to an advantageous further development it can be provided that at least part of the edge region of the reflector assembly is accommodated in a gap space which in the direction towards the barrier arrangement is bounded by the counter-abutting section and in the direction away from the barrier arrangement by a fixing component connected rigidly with the sensor housing. Once again, the fixing component can be firmly bonded with the sensor housing, for instance through welding, in particular laser welding, soldering, or gluing. Alternatively or additionally, the fixing component can be force-fitted to a section of the sensor housing through a clamp fit and/or press fit as the case may be. The latter is in particular possible in the preferred case of a tubular sensor housing, if a fixing component, for example as a securing ring, is arranged with press fit radially inside a housing section surrounding the fixing component. To this end, the fixing component can for example be significantly cooled and thus be inserted thermally shrunk into the heated, if desired, and consequently thermally expanded housing section, whereupon the temperatures of the fixing component and the housing section are allowed to equalize with one another.

In order to prevent undesirable free movement, in the fully assembled state of the sensor assembly the abutting section of the reflector assembly can abut both against the counter-abutting section and against the fixing component and can be clamped between these formations.

Alternatively or additionally, the spacing-securing means can exhibit a supporting section at the reflector assembly which is supported physically at the barrier arrangement. For example, the reflector assembly can exhibit one or several projections protruding towards the barrier arrangement as the supporting section, which like a spacer form a physical barrier against an approach of the reflector assembly to the barrier arrangement. Likewise, such a supporting section can be configured at the edge of the reflector assembly, such that once again a central region of the reflector assembly, unaffected by the supporting section, can reflect the measurement radiation incident on the reflector assembly. For example, the reflector assembly can be designed to be pot-shaped, where the lateral surface of the pot shape forms the supporting section and the disc-like bottom of the pot shape exhibits the at least one passage and on the signal side a surface section reflecting the measurement radiation. Instead of a surrounding lateral surface, the supporting section can exhibit through at least two, preferably more than two, projections arranged at a distance from another in the circumferential direction about a central region of the reflector assembly.

Further additionally or alternatively, the spacing-securing means can exhibit a force-fitted and/or firmly bonded engagement of a retaining section of the reflector assembly with a counter-retaining section of the sensor housing. Thus, the retaining section can be glued, welded, or soldered with a counter-retaining section configured at the sensor housing or at a component connected firmly with the sensor housing or, given sufficiently stable configuration of the retaining section, fixed with force-fit and/or frictionally engaged as the case may be at the counter-retaining section, for instance through press fit. For especially secure setting of the reflector assembly at the sensor housing, the aforementioned supporting section can also be a retaining section. For example, the aforementioned lateral surface of a pot-shaped reflector assembly can be supported with its free edge on the barrier arrangement and with its radially outward-facing side be glued, soldered, or welded with the sensor housing or with a component fixed at the sensor housing.

Likewise, the aforementioned abutting section can also be a retaining section, for instance if the abutting section is firmly bonded with the counter-abutting section, i.e., for example glued, soldered, or welded.

Although above a pot-shaped or disc-like reflector assembly with projections is mentioned, the reflector assembly can be configured as completely disc-like and planar.

Then the reflector assembly can be formed simply as a stamped component or through laser cutting of a thin planar sheet material. In the preferred case of a tubular sensor housing, a planar reflector assembly or a planar reflective section of the reflector assembly is preferably arranged oriented orthogonally to the housing axis.

To facilitate fabrication, the reflector assembly is preferably configured integrally, inclusive of abutting section and/or supporting section and/or retaining section.

In particular when the radiation source and/or the detector device is or are respectively configured and/or arranged asymmetrically with respect to the reflector assembly, a rotation of the reflector assembly about a reference axis penetrating orthogonally through a reflective surface on the signal side of the reflector assembly, in particular about a reference axis parallel to the aforementioned housing axis or about the housing axis, can impact the signal quality of the reflected measurement signal detected by the detector device.

Therefore, the reflector assembly can exhibit an anti-rotation device which prevents rotation of the reflector assembly relative to the sensor housing and/or which allows arrangement of the reflector assembly relative to the sensor housing in only at least one predetermined relative rotational position region, in particular in only at least one predetermined relative rotational position, respectively.

Preferably the anti-rotation device is the aforementioned spacing-securing means. The reflector assembly can exhibit, in particular at its edge region, an anti-rotation formation in the form of a projection or a recess and the sensor housing or a component firmly connected with the sensor housing can exhibit an anti-rotation counter-formation in the form of a recess or a projection. Given operational arrangement of the reflector assembly at the sensor housing, a formation consisting of anti-rotation formation and anti-rotation counter-formation can engage with positive fit with the respective other formation, thus allowing normal arrangement of the reflector assembly at the sensor housing only when the anti-rotation formation and the anti-rotation counter-formation are oriented relative to one another such that they can reach positive fit engagement with one another.

Given a disc-like shape of the reflector assembly, the anti-rotation formation can be achieved through a non-rotation-symmetrical shape of the edge of the reflector assembly. The anti-rotation counter-formation can then exhibit a recess or depression with an appropriately complementary edge, into which the reflector assembly can be inserted only in at least one discrete angular position relative to the sensor housing. For example, for configuring the anti-rotation formation the reflector assembly can have a polygonal edge.

The polymer material of the polymer matrix can comprise or be a silicone, fluorosilicone, polytetrafluoroethylene (PTFE), fluoroethylene propylene (FEP), and/or polymethyl pentene (PMP). These polymer materials allow the migration into the materials and back out of them of numerous known analytes which modify, in particular absorb, electromagnetic radiation of a known wavelength. The analyte of the present sensor assembly is preferably $CO_2$.

In order to avoid gas reservoirs, polymer material preferably extends from the barrier arrangement continuously up to the reflector assembly. According to a preferred embodiment, the polymer material of the polymer matrix, preferably silicone, is applied onto the reflector assembly and is crosslinked with it. The polymer matrix therefore adheres to the reflector assembly. It should, however, not be ruled out that an already crosslinked silicone layer is arranged at the reflector assembly and is adhesively bonded with it.

A bonding of the polymer matrix with the barrier arrangement is preferably established through an adhesive layer which bonds the surface of the polymer matrix facing away from the reflector assembly with a surface of the barrier arrangement. Preferably the adhesive layer is a material selected from the same synthetic class to which the material of the polymer matrix belongs. If the polymer matrix is a silicone, a silicone is also preferably used as an adhesive layer. The polymer matrix is thus preferably firmly bonded via the adhesive layer with the barrier arrangement. In order to also rule out gas reservoirs next to the polymer matrix in which the analyte constituent can accumulate, thus falsifying the detection result of the sensor assembly, preferably the polymer material of the polymer matrix, where applicable together with the polymer material of the adhesive layer for bonding the polymer matrix with the barrier arrangement, fills completely a hollow space which is bounded by the barrier arrangement, by the reflector assembly, and by a section of the sensor housing or of a component accommodated at the sensor housing situated between the barrier arrangement and the reflector assembly. The polymer material of the polymer matrix, where applicable together with the polymer material of the adhesive layer, consequently borders a solid, preferably on all sides, except at the at least one passage of the reflector assembly.

In order to protect the reflector assembly from constituents of the measurement fluid, polymer material can be situated both on the signal side and on the fluid side. Since the polymer material on the fluid side serves essentially only for screening the reflector assembly whereas the polymer material on the signal side serves for taking up the analyte constituent, to achieve the most advantageous signal-to-noise ratio possible the polymer matrix arranged on the signal side can cover a larger area of the reflector assembly and/or exhibit greater thickness than a layer of polymer material arranged on the fluid side. Additionally or alternatively, to increase the service life of the sensor assembly it can be provided that the polymer matrix arranged on the signal side exhibits higher thermal resistance and/or a lower thermal expansion coefficient than the layer of polymer material applied to the fluid side. A temperature change in the region of the specimen section has then the smallest possible impact on the functional layer essential for the sensor assembly, namely the polymer matrix. Through the lowest possible thermal expansion coefficient, mechanical stressing of the reflector assembly through heating of the polymer matrix can be decreased or even avoided.

In order to ensure that the at least one analyte constituent can migrate through the polymer layer on the fluid side into the polymer matrix, the polymer layer on the fluid side is preferably selected from the same synthetic class as the polymer matrix. In the present preferred example, the polymer layer on the fluid side is preferably also a silicone.

The polymer matrix on the signal side is preferably 3 to 5 times as thick as the polymer layer on the fluid side of the reflector assembly. The polymer matrix on the signal side can preferably be 140 to 180 μm thick, especially preferably it is 160 μm thick. The polymer layer on the fluid side can preferably be 30 to 60 μm thick, especially preferably it is 40 to 50 μm thick. The polymer layer on the fluid side can be formed from at least two part-layers, for example from the mentioned protective layer and from a sealing layer applied to the side of the protective layer facing away from the reflector assembly. The sealing layer can be applied after assembly of the reflector assembly at the specimen section, in order to fill up and/or seal as the case may be the reflector assembly and any gap and/or gusset spaces between the reflector assembly and the specimen section surrounding it. The sealing layer can be 5 to 15 μm thick, preferably 10 μm. The aforementioned adhesive layer between the polymer matrix and the barrier arrangement can for preference be 5 to 45 μm thick, preferably 40 μm. In order to achieve an especially advantageous homogeneous polymer formation, the polymer matrix, the polymer layer on the fluid side, and the adhesive layer can be formed from one and the same polymer, preferably from silicone.

The polymer matrix is preferably thicker than the reflector assembly, which in turn is preferably thicker than the protective layer.

A further advantageous further development of the present invention concerns the optimal utilization of the measurement radiation emitted by the radiation source to achieve a signal detectable by the detector device with at the same time short response time of the polymer matrix to a change in the content of analyte constituent in the measurement fluid of the measurement environment. As described at the beginning, optimal utilization of the measurement radiation requires the largest possible reflective surface of the reflector assembly. Short measurement cycles require, in contrast, achieving a short response time the largest possible passage area through the reflector assembly. Due to the bounded total area of the reflector assembly, increasing the passage area is achievable only at the expense of the reflective area and vice versa. A very good compromise given the two conflicting objectives is obtained through a configuration of the reflector assembly in which the reflector assembly exhibits a plurality of passages penetrating through the reflector assembly, where the passages, considered over the area of the fluid side accessible to the at least one analyte constituent and/or over the region of the signal side of the reflector assembly not obscured to measurement radiation, are configured and/or arranged with a heterogeneous distribution. It should, however, not be ruled out that the passages, considered over the area of the fluid side accessible to the at least one analyte constituent and/or over the region of the signal side of the reflector assembly not obscured to measurement radiation, are configured and/or arranged with a homogeneous distribution, i.e., with a uniform size in a regular pattern with uniform spacings of the passages along the respective sequential directions of the pattern, in which passages are arranged consecutively in the pattern.

The present application also concerns as a discrete object a sensor assembly of the type mentioned at the beginning, whose reflector assembly exhibits a plurality of passages penetrating through the reflector assembly, where the passages, considered over the area of the fluid side of the reflector assembly accessible to the at least one analyte constituent, are configured and/or arranged with a heterogeneous distribution, or in other words a combination of the preamble of claim 1 with the features of claim 10. This object can be further developed in accordance with the above description, i.e., in particular with the features of the characterizing portion of claim 1 and/or at least of one of the claims 2 to 9.

Through the configuration of a plurality of passages and through their heterogeneously distributed arrangement over a region of the reflector assembly exhibiting both the passages and the reflective surface, at least one region with increased passage cross-sectional area and at least one further region with increased reflective surface can be configured, where each of the two regions is preferably larger than one fourth of the total area of the signal side not obscured to measurement radiation on the signal side, in particular larger than one fourth of the section of the reflector assembly extending transversely, in particular orthogonally, to the aforementioned housing axis.

To achieve the aforementioned heterogeneity of the passages in the reflector assembly, the reflector assembly can exhibit passages with different passage cross-sectional areas, i.e., passages differing in size. Additionally or alternatively, the reflector assembly can exhibit passages with differing passage cross-sectional shapes. Further additionally or alternatively, the reflector assembly can exhibit on its fluid-side area which is accessible to the at least one analyte constituent surface regions with differing passage densities, i.e., surface regions in which more passages are arranged per unit area than in other surface regions.

The area fraction of passage cross-sectional areas out of the total area of the region of the signal surface not obscured to measurement radiation is preferably at least 20%, especially preferably at least 25%, and most preferably at least 30%. The area fraction is preferably at most 50%, especially preferably at most 42.5%, and most preferably at most 35%.

The area of the fluid side of the reflection arrangement which in the present application is accessible to the analyte constituent corresponds to that area of the fluid side, where applicable coated as described above with polymer material, i.e., for instance with a protective layer and a sealing layer applied onto the latter, which can be wetted by measurement fluid.

The radiation source, preferably an LED, normally emits electromagnetic radiation along an optical axis. The radiation can be emitted in a radiation cone whose cone axis is the optical axis of the radiation source. According to a preferred embodiment, in order to achieve the highest possible yield of reflected radiation on its signal side the reflector assembly can exhibit in a circular region an area fraction of passage cross-sectional areas out of the area of the region which is smaller by at least 20 percent than in an annular region with the same area surrounding the circular region. The circular region contains as a midpoint an impingement point at which an optical axis outbound from the radiation source impinges on the signal side. The area content of the circular region is at least 10%, preferably at least 20%, of the total area of the signal side not obscured to measurement radiation on the signal side. To clarify: Here not an area fraction of passage cross-sectional areas smaller by 20 percentage points is being referred to, but rather an area fraction actually smaller by 20%. The annular region surrounds the circular region preferably concentrically and is preferably circularly annular. The total area of the reflector assembly on the signal side not obscured by the sensor housing includes the passage cross-sectional areas not obscured to measurement radiation.

Through the arrangement of a passage-lean zone in the impingement region of the optical axis of the radiation source it can be made sure that a significant fraction of the electromagnetic radiation emitted by the radiation source is reflected, where it impinges on a reflective surface on the signal side, back to the instrument section. In a region situated at a greater distance from the impingement region of the optical axis on the signal side, in contrast, the largest possible diffusion exchange area can be ensured at the polymer matrix by an increased fraction of passages being provided there.

Additionally or alternatively, the signal side of the reflector assembly can exhibit in a circular region, which as midpoint has the area center of the entire area of the signal side not obscured to measurement radiation on the signal side and whose area content equals at least 10%, preferably at least 20%, of the entire area of the reflector assembly not obscured to measurement radiation on the signal side, an area fraction of passage cross-sectional areas out of the area of the region which is smaller by at least 20 percent than in an annular region with the same area surrounding the circular region. The annular region preferably surrounds the central region concentrically and is preferably itself circularly annular. With an arrangement of a passage-lean zone in a central region of the non-obscured area, the installation space for accommodating both the radiation source and the detector device can be divided approximately equally across both devices. Often the impingement region of the optical axis on the signal side of the reflector assembly lies in a central region of the area not obscured by the sensor housing.

When assessing the area of the signal side not obscured to measurement radiation what matters is obscuration of the signal side by obscuring formations in the region between the radiation module and the reflector assembly.

The aforementioned circular regions with an area content of at least 10%, preferably at least 20% of the total area of the reflector assembly not obscured on the signal side to measurement radiation are preferably not larger than 35%, especially preferably not larger than 25% of the non-obscured area.

Preferably at least a majority of passages, especially preferably all passages, are circular recesses with a diameter of 0.5 mm to 1.2 mm, preferably of 0.8 mm to 1.0 mm. These can be very well distributed with different densities across the area of the fluid side accessible to the at least one analyte constituent or across the area of the signal side not obscured to measurement radiation, respectively.

A further possible design of the heterogeneity of the passages in the reflector assembly can be realized by a circular region existing in the entire area of the reflector assembly on the signal side not obscured to measurement radiation, whose area content equals at least 1.3 times the mean cross-sectional area of the passages in the entire area of the reflector assembly on the signal side not obscured to measurement radiation and which is free from a passage cross-sectional area. This applies first and foremost to reflector arrangements whose individual passages exhibit passage cross-sectional areas of not more than 1 $mm^2$ each, preferably of not more than 0.8 $mm^2$ each. The passage cross-sectional areas of the individual passages are preferably at least 0.2 $mm^2$ each.

Preferably at least the specimen section of the tubular sensor housing exhibits a diameter not exceeding 12 mm, where that the outer surface of the sensor housing, at least in the specimen section, is preferably cylindrical or conical. Preferably, moreover, at least one part of the instrument section which accommodates the radiation module exhibits a diameter not exceeding 12 mm.

The detector device exhibits a detector surface sensitive to measurement radiation. Often the detector surface is rectangular, although this does not necessarily have to be the case. In order to be able to accommodate both the radiation source and the detector device in the smallest possible installation space, preferably a radiation exit surface of the radiation source is situated nearer to the barrier arrangement than the detector surface. Likewise in order to reduce the installation space required by the radiation module for its accommodation in the sensor housing, additionally or alternatively the optical axis of the radiation source can be tilted with respect to a housing axis along which the sensor housing extends more than a normal to the detector surface. For example, the detector surface can be oriented orthogonally to a parallel to the housing axis or enclose with a parallel to the housing axis an angle not smaller than 75°, preferably not smaller than 80°. The normal to the detector surface is then parallel to a parallel to the housing axis or encloses with it an angle of 15° or 10°. The optical axis of the radiation source, in contrast, can enclose with a parallel to the housing axis or with the normal to the detector surface respectively an angle of between 15° and 35°, in particular from 17° to 25°, especially preferably from 19° to 21°.

To facilitate the fitting of the sensor assembly, the radiation source and the detector device can be accommodated in a common holder in the instrument section. The common holder can be made from a good heat-conducting material, in particular from metal, in order to first and foremost dissipate heat from the radiation source. Preferably the sensor housing, at least in the part of the instrument section accommodating the holder, is likewise made from a good heat-conducting material, again preferably from metal. For reasons of high chemical resistance and high strength, the sensor housing at least in the part of the instrument section accommodating the holder and/or likewise the holder, is especially preferably made from stainless high-alloy steel. The holder is preferably in touching contact with an inner wall surface of the instrument section of the sensor housing, such that the holder can transfer heat given out by the radiation source conductively to the sensor housing.

To prevent overheating of the detector device in the holder, a thermally insulating layer can be arranged between the detector device and the holder. The thermally insulating layer has preferably a thermal conductivity which is at least an order of magnitude smaller than that of the material of the holder. For example, the detector device can be accommodated in a cylindrical or frustoconical sleeve which surrounds it completely and is open at both its end faces in order to ensure at one longitudinal end the irradiation of electromagnetic radiation onto the detector surface and in order to be able at the opposite longitudinal end to lead away from the detector device signal-carrying lines which carry detection signals of the detector device to signal processing electronics and/or which carry control signals from control electronics to the detector device. The thermally insulating layer can be formed from a synthetic, for instance from polyetheretherketone (PEEK), polyphenylsulfone, or from polyimides.

For temperature compensation of the detection signals of the detector device it is advantageous if a radiation module temperature sensor is arranged in such a way that it detects the temperature in the region of the radiation module exhibiting the radiation source and the detector device, in particular the temperature of the holder and/or the temperature in a volume between holder and barrier arrangement through which electromagnetic radiation of the radiation source passes. Preferably the holder can carry the radiation module temperature sensor for detecting a temperature. The radiation module temperature sensor also exhibits a signal-carrying line which, preferably on the side of the holder facing away from the barrier arrangement, leads away from the radiation module temperature sensor.

It is further conceivable to use permanently a region of the sensor assembly starting from the barrier arrangement and proceeding in the direction away from the specimen section, and arrange the specimen section as a sensor housing part detachably at the rest of the sensor housing part exhibiting the instrument section. To this end, the barrier arrangement can be divided into an instrument-side barrier arrangement part and a fluid-side barrier arrangement part. Likewise, the sensor housing can be subdivided into an instrument-side housing part carrying the instrument-side barrier arrangement part and a fluid-side housing part carrying the fluid-side barrier arrangement part. In the operationally assembled state, preferably the two barrier arrangement parts abut against one another or are situated separated from one another by an air gap, where preferably the air gap is smaller than the combined thickness of the two barrier arrangement parts in order to avoid undesirably large aberrations due to multiple refraction of the measurement radiation at transitions with different densities, i.e., for instance at boundaries of the barrier arrangement parts. As a replaceable object, the fluid-side barrier arrangement part can be accommodated together with the polymer matrix and the reflector assembly at the fluid-side housing part and normally be coupled detachably with the instrument-side housing part. The fluid-side housing part can be pluggable or screwable onto the instrument-side housing part. The fluid-side housing part can, for example, be secured against loss through bayonet locking to the instrument-side housing part.

The above notwithstanding, the barrier arrangement can be arranged completely at the instrument-side housing part. The fluid-side housing part can then exhibit the polymer matrix and the reflector assembly, and where appropriate a protective layer configured as described above on the fluid side of the reflector assembly.

The barrier arrangement can likewise be arranged completely at the fluid-side housing part, although this is not preferred since the barrier arrangement protects the components arranged in the instrument-side housing part, such as radiation source, sensor, and any other electronic components, against external effects.

The fluid-side housing part can be arrangeable detachably at the instrument-side housing part, for example as a kind of cap. The fluid-side housing part can be a separate loose housing part. Alternatively, the fluid-side housing part can be connected with a wall of a vessel, such as for example of a bioreactor, which contains the measurement fluid or through which measurement fluid flows.

When the fluid-side housing part exhibits at least one wall section made from a material compatible with a material of a vessel wall of the vessel accommodating the measurement fluid or through which measurement fluid flows, the wall section of the fluid-side housing part can be configured integrally or bonded with the vessel wall or at least with a section of the vessel wall.

For example, when the vessel wall is made from a synthetic and when a wall section of the fluid-side housing part is made from the same or from a compatible synthetic, the vessel wall and the wall section of the fluid-side housing part can be welded with one another through plastic welding or can be configured integrally, for example through injection molding. The same applies to a vessel wall made from metal and a wall section of the fluid-side housing part made from metal. These too, can for example be bonded non-detachably with one another through welding or can be configured integrally, for instance through deep drawing and/or through machining.

Welded bonding has the advantage that with correct implementation, it not only creates secure and firm bonding but also prevents the tightness of this bonding against the passage of measurement fluid through the joint.

In principle, gluing the vessel wall and wall section of the fluid-side housing part is also conceivable. In comparison, however, the welded bonding is preferable since it does without adhesives such that with a welded bonding there is no or almost no risk of migration of material components from the join, for instance into the measurement fluid. If, however, adequately inert adhesives are available which cannot be dissolved by the measurement fluid or by a washing fluid that where applicable may be used to clean the vessel, adhesive bonds can also be used for reactors for biologically and/or chemically sensitive processes.

For the case of using incompatible materials for the vessel wall on the one hand and for the wall section of the fluid-side housing part on the other, one of the two components out of a wall section of the vessel for accommodating or conducting measurement fluid and a wall section of the fluid-side housing part, in particular the wall section of the fluid-side housing part, can exhibit an anchoring structure which reaches into the material of the respective other component and there is surrounded by the material of the other component and/or is embedded in the material of the respective other component, as the case may be. Thereby one component can be anchored at the other component with a positive fit.

Preferably the component with the more rigid material, for instance with the material having the greater absolute modulus of elasticity, will exhibit the anchoring structure and the component with the less rigid material will surround and/or embed in it the anchoring structure, as the case may be.

The anchoring structure can be a structure protruding towards the respective other component, such as for example in the case of the fluid-side housing part as carrier of the anchoring structure a disc structure, truss structure, or lattice structure, and the like protruding radially outward from the fluid-side housing part radially with respect to a housing axis as a central longitudinal axis of the fluid-side housing part. The anchoring structure is preferably as flat as possible, i.e., exhibits the smallest possible axial dimension along the housing axis, but at the same time exhibits the largest possible surface for secure embedding in the material of the respective other component, preferably in the material of the wall section of the vessel for accommodating or conducting measurement fluid.

The anchoring structure preferably extends, interrupted or uninterrupted, in the circumferential direction about the housing axis of the fluid-side housing part in order to ensure the most uniformly high joint strength around the circumference of the fluid-side housing part.

Until the arrangement of the instrument-side housing part at the fluid-side housing part, the instrument-side housing part and/or the fluid-side housing part can each be protected by a cap from external effects, such as for example dirt etc. The cap can be retained at the instrument-side and/or fluid-side housing part like the respective other housing part with the same securing means, such as for instance positive fit means, for example a thread or a formation consisting of projection and angled guide track of a bayonet lock. Alternatively or additionally, the cap can be frictionally engaged with the housing part assigned to it.

In order to provide the sensor assembly as independently deployable as possible, i.e., with the fewest possible peripheral instruments, control and/or signal processing electronics can be arranged in the instrument section of the sensor housing for controlling the radiation source and/or the detector device and/or for evaluating detection signals of the detector device. The aforementioned signals of the radiation module temperature sensor can also be received by the signal processing electronics and used for temperature compensation of the detection signals of the detector device.

Since the control and/or signal processing electronics can also be subject to temperature fluctuations and to performance variations effected by the temperature fluctuations, according to an advantageous further development there is accommodated in the instrument section an electronic temperature sensor for detecting a temperature in the region of the control and/or signal processing electronics. The sensor signal of the electronic temperature sensor can be used for temperature compensation, in particular through the control and/or signal processing electronics. Preferably the control and/or signal processing electronics utilizes both temperature signals from the radiation module temperature sensor in order to compensate for temperature effects on the radiation module, and temperature signals from the electronic temperature sensor in order to compensate for temperature effects on the control and/or signal processing electronics.

In the instrument section of the sensor housing there can be arranged a capturing material, also referred to as 'getter material', which is accessible to the gas volume in the instrument section, in order to bind humidity and/or substances emitted from the control and/or signal processing electronics. As such a capturing material there can be deposited in the instrument section silica gel, a molecular sieve, zeolite, and/or other hygroscopic materials such as for example calcium chloride ($CaCl_2$)), sodium hydroxide (NaOH), potassium hydroxide (KOH), or magnesium perchlorate ($Mg(ClO_4)_2$.

For better heat dissipation of heat emanating from the radiation source, preferably the wall thickness of the sensor housing in the region of the accommodated radiation source and of the detector device is lower than in the region of the accommodated control and/or signal processing electronics. The locally lower mass of the sensor housing achieved through the lower wall thickness heats up more intensely and quickly under heat transfer from the radiation source than with a greater wall thickness. Due to the more intense heating up, the section of the sensor housing can give off heat more effectively to its external environment, be it conductively and/or convectively. A greater wall thickness of the sensor housing in the region of the accommodated control and/or signal processing electronics offers the electronics mechanical protection from external effects and in the aforementioned case of a preferred metallic configuration of the sensor housing also outstanding electromagnetic screening.

The sensor housing can be joined together from several housing components. To achieve a stable sensor housing, housing components can be welded with one another where preferably the join is surface-processed after the joining process, for instance machined, for example turned and/or ground, and if necessary polished, in order to be able to insert the sensor housing so as to fit as exactly as possible into a setting near the envisaged measuring point.

The barrier arrangement can be made from diamond, cadmium telluride, thallium bromide iodide, silicon, germanium, zinc selenide, cesium chloride, silver chloride, calcium fluoride, and/or potassium bromide. Preferably the barrier arrangement exhibits a sapphire glass disc or is such. Sapphire glass is cost-effective, non-toxic, exhibits relatively high thermal conductivity and is transparent first and foremost to infrared radiation. In order to screen the instrument section from the at least one analyte constituent of the measurement fluid, the barrier arrangement is preferably firmly bonded with the sensor housing. The barrier arrangement, in particular as a sapphire glass disc, can be glued or cemented with the sensor housing, and is especially preferably bonded with the sensor housing through a fused joint. The fused joint is formed through a substance which is at least once thermally softenable and hardenable again, for example fused glass. A bonding of the barrier arrangement with the sensor housing can, however, also be formed through a thermally hardenable substance, such as a hardenable, in particular thermally, thermoset.

The present application further concerns a reflector assembly, as described above, in particular with the polymer matrix and the mentioned further polymer layers which may be present.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
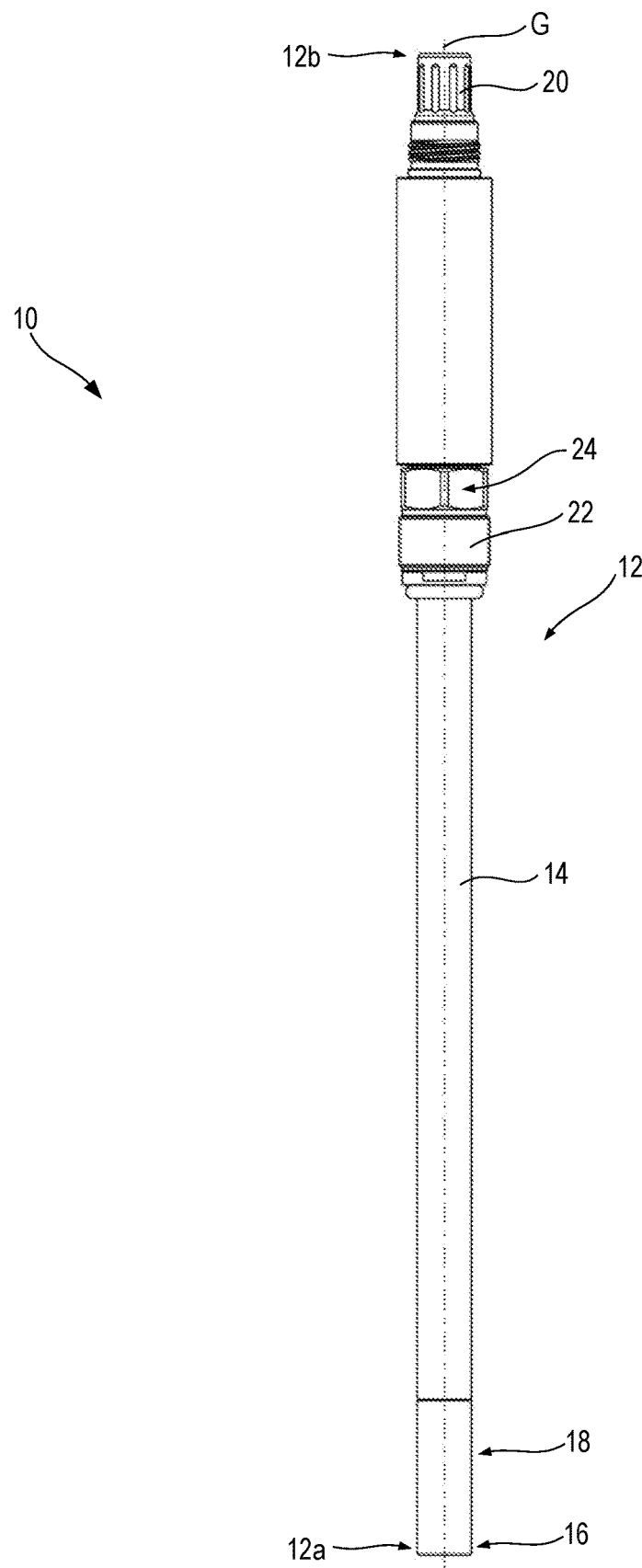
FIG. 1A rough schematic top view of a sensor assembly according to the invention with the direction of view orthogonal to the housing axis of the sensor housing, FIG. 2A rough schematic sectional view through the free longitudinal end of the sensor assembly of FIG. 1 which in normal measurement operation is wetted by the measurement environment, FIG. 3A rough schematic sectional view along the sectional plane III-III which is orthogonal to the housing axis G in FIG. 2, FIG. 4A rough schematic detail enlargement of the section denoted by IV in FIG. 2, FIG. 5A possible embodiment of a reflector assembly of the sensor assembly of FIG. 1, FIG. 6A preferred embodiment of the reflector assembly of the sensor assembly of FIG. 1, FIG. 7 The reflector assembly of FIG. 6 in a rough schematic exploded view, FIG. 8A rough schematic exploded view of the devices accommodated inside the instrument section near the barrier arrangement, FIG. 9A rough schematic partial longitudinal sectional view through the region of the sensor assembly of FIG. 1 containing the longitudinal measurement end, FIG. 10A rough schematic longitudinal sectional view through two different embodiments of a fluid-side housing part of a sensor assembly according to the invention configured integrally with a wall of a vessel for accommodating or conducting measurement fluid, each covered with a protective cap, FIG. 11A rough schematic longitudinal sectional view through the two different embodiments of the fluid-side housing part of FIG. 10, each with its associated instrument-side housing part, and FIG. 12A rough schematic longitudinal sectional view through two different alternative embodiments of the fluid-side housing part of a sensor assembly according to the invention configured integrally with a wall of a vessel for accommodating or conducting measurement fluid, each with its associated instrument-side housing part.

Referring now to the drawings wherein the showings are for the purpose of illustrating preferred and alternative embodiments of the invention only and not for the purpose of limiting the same, in FIG. 1 there is depicted an embodiment according to the invention of the present application in a rough schematic elevation view and labelled generally by 10. A sensor housing 12 encasing the functional components of the sensor assembly extends along a housing axis G and exhibits a roughly tubular shape. A section of the sensor housing 12 which in the present example accounts for more than half of the total length of the sensor assembly is formed by a tubular component 14. The free longitudinal end 12a of the sensor housing 12, the lower one in FIG. 1, exhibits as a longitudinal measurement end 12a a specimen section 16 elucidated further in detail below, which in the predetermined measurement operation is exposed to a measurement environment M containing a measurement fluid to be examined with regard to an analyte constituent.

In an instrument section 18 following the specimen section 16 away from the longitudinal measurement end 12a there are accommodated optical and electronic components of the sensor assembly 10. In contrast, the specimen section 16 exhibits components which provide the at least one analyte constituent of the measurement fluid detectable by the sensor assembly 10 in a form suitable for a detection process.

At the connecting longitudinal end 12b opposite axially to the longitudinal measurement end 12a with respect to the housing axis G the sensor housing 12 exhibits a preferably gas-tight connecting collar 20 for carrying at least one signal-transmitting line from outside into the sensor housing 12 and from inside the sensor housing 12 to the outside, in order to connect the sensor assembly 10 for example with peripheral instruments for reading out, playing back, and/or documenting detection signals and detection results.

The depiction of the sensor housing 12 in FIG. 1 is merely by way of example and the sensor housing 12 could exhibit any arbitrary other shape. However, the long slim shape shown in FIG. 1 is advantageous for arranging the longitudinal measurement end 12a when so desired at a distance from a vessel wall inside a vessel containing the measurement fluid. For fixing the sensor housing 12 to a housing wall or to a socket, the sensor housing 12 can exhibit an external thread section 22. Preferably the diameter of the tubular component 14 is smaller than the diameter of the external thread section 22, such that the tubular component 14 can be led through an internal thread section of a socket or a housing wall matching the external thread section 22 and positioned at its desired measuring position.

The sensor assembly 10 can be screwed with the aforementioned internal thread section securely and with the desired firmness through a tool engagement section 24 on the side of the external thread section 22 facing away from the longitudinal measurement end 12a. In the present case, the tool engagement section 24 comprises a known external hexagonal head formation for engaging with an open-end wrench.

Instead of an external thread, there can be provided at the sensor housing a projection for introduction into an L-shaped recess at the socket or at the housing wall or there can be provided an L-shaped recess for interacting with a matching projection at the socket or at the housing wall as the case may be in order to fix the sensor assembly 10 axially through bayonet locking at the socket or at the housing wall as the case may be.

Figure 2:
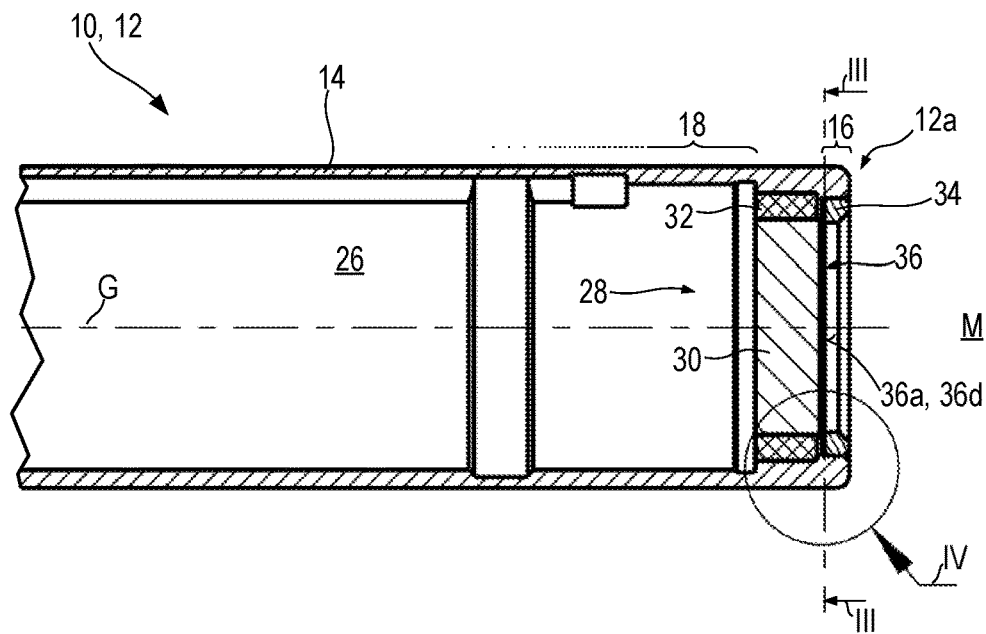

In FIG. 2 there is shown in rough schematic form a cross-sectional view through an end region of the sensor assembly 10 containing the longitudinal measurement end 12a.

The specimen section 16 reaches from a barrier arrangement 28 accommodated in the interior 26 of the sensor housing 12 to the longitudinal measurement end 12a of the sensor assembly 10. On the side of the barrier arrangement 28 opposite to the longitudinal measurement end 12a there begins the instrument section 18, which extends from the barrier arrangement 28 in the direction towards the connecting longitudinal end 12b. For the sake of better clarity, the interior 26 of the instrument section 18 of the sensor housing 12 is depicted empty in FIG. 2.

The barrier arrangement 28 comprises a centrally arranged sapphire glass disc 30 through which the virtual housing axis G penetrates, firmly bonded with the sensor housing 12, in particular with the tubular component 14, through a thermoplastic cement 32. The thermoplastic cement 32 can for example be fused glass, which after solidifying bonds the sapphire glass disc 30 in a high-temperature resistant manner with the sensor housing 12. Alternatively, the thermoplastic cement 32 can be a high-temperature resistant thermoplastic or thermosetting synthetic which tolerates temperatures above 200° C. without softening.

In the specimen section 16 there is arranged radially inside the sensor housing 12 a securing ring 34 which secures a reflector assembly 36 to be elucidated below in connection with FIGS. 3 and 4 at the sensor housing 12.

Figure 3:
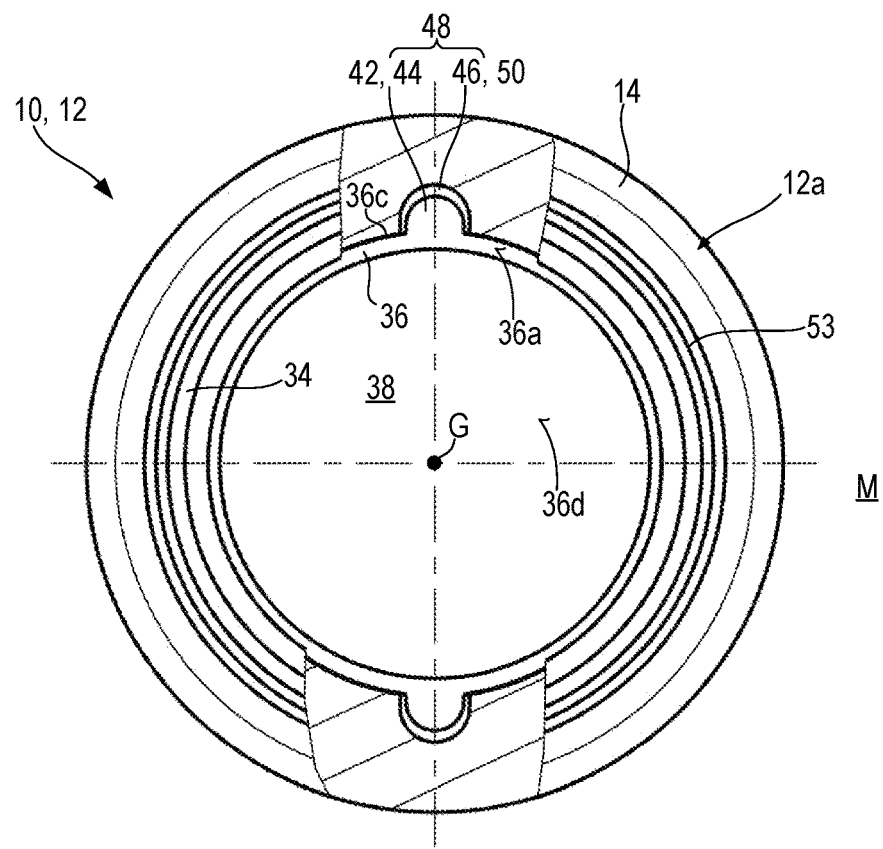

FIG. 3 shows a partial sectional view of the longitudinal measurement end 12a and/or of the specimen section 16 respectively along the sectional plane III-III of FIG. 2 when observed in the axial direction along the housing axis G. FIG. 4 shows a magnified view of region IV of FIG. 2.

In the present example the reflector assembly 36 is a planar disc-like reflector assembly from stainless steel, with a thickness of preferably 50 or 100 μm. The reflector assembly 36 exhibits on its fluid side 36a which faces away from the barrier arrangement 28, which the observer of FIG. 3 views, a protective layer 38 from a polymer material which is permeable to the at least one analyte constituent. The protective layer 38 is applied in the form of a circular disc. It has a thickness of preferably 40 μm and in the depicted example made from silicone, which is permeable to $CO_2$ as the preferred analyte constituent.

Figure 4:
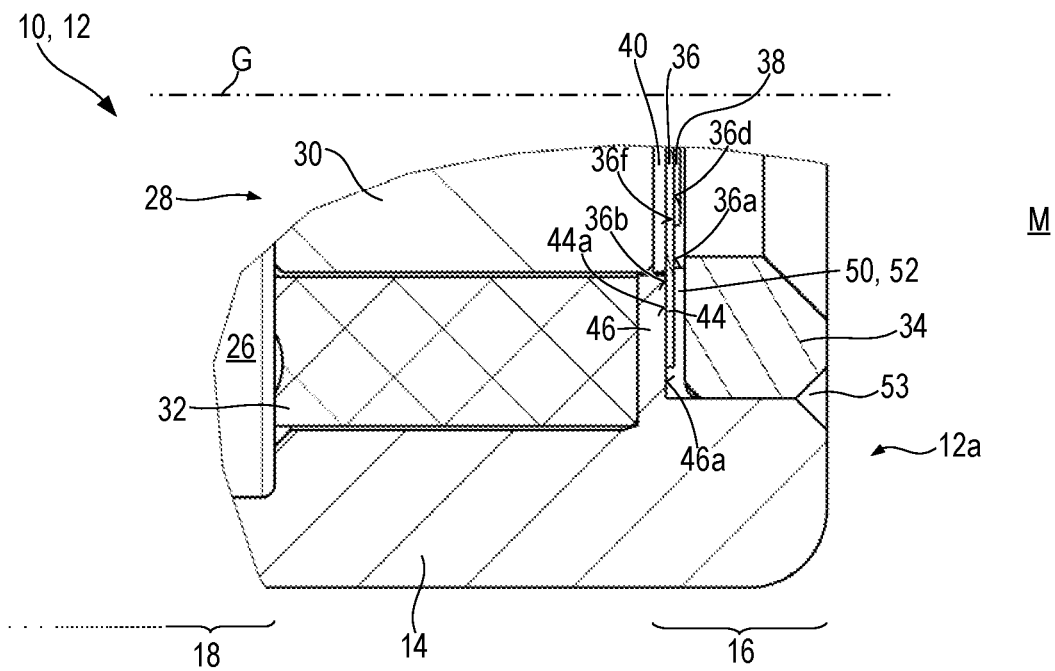

As can be seen in particular in FIG. 4, on the signal side 36b which is opposite to the fluid side 36a with the protective layer 38 there is applied a polymer matrix 40 which preferably is likewise made from silicone and exhibits a thickness of 160 μm. The polymer matrix 40 is cemented through silicone with the end face of the sapphire glass disc 30 which faces towards it. The silicone can be applied in the non-crosslinked state and then be crosslinked. The polymer matrix 40 on the signal side 36b is likewise shaped as a circular disc and extends on the signal side 36b over a larger area than the protective layer 38 on the fluid side 36a.

As can be discerned first and foremost in FIG. 3, the reflector assembly 36 exhibits at its edge region 36c a projection 42 configured integrally with the reflector assembly 36, forming an abutting section 44 which is in abutting engagement with a counter-abutting section 46 joined integrally with the sensor housing 12, in particular with the tubular section 14. The abutting engagement physically prevents an approach of the reflector assembly 36 to the barrier arrangement 28 and to the instrument section 18 which when viewed from the reflector assembly 36 lies behind it.

The abutting section 44 and the counter-abutting section 46 form together a spacing-securing means 48. An abutting surface 44a of the abutting section 44 or more specifically of the projection 42 abuts against a counter-abutting surface 46a of the counter-abutting section 46. The projection 42 is cemented, soldered, or preferably welded with the material of the counter-abutting section 46, for instance through laser welding, in order to fix the reflector assembly 36 definitely relative to the sensor housing 12. In the present embodiment example, the fixing is firmly bonded. Consequently the projection 42 or more specifically the abutting section 44 formed from the projection 42 is also a retaining section within the terms of the descriptive introduction. Likewise, the counter-abutting section 46, with which the abutting section 44 or more specifically retaining section is firmly bonded, is a counter-retaining section within the terms of the descriptive introduction.

The abutting section 44 is accommodated in a depression 50 at the sensor housing 12, in particular at the tubular section 14, which the abutting section 44 encloses on both sides in the circumferential direction about the housing axis G, such that the depression 50 together with the abutting section 44 allows an arrangement of the reflector assembly 36 at the sensor housing 12 only in two defined relative angular positions about the housing axis G rotated by 180°. The firmly bonded fixing of the abutting section 44 at the sensor housing 12 is not only an anti-approach protection and an anti-takeoff protection of the reflector assembly 36 against movement along the housing axis G relative to the sensor housing 12, but is also an anti-rotation protection of the reflector assembly 36 against rotation of the reflector assembly 36 relative to the sensor housing 12 about the housing axis G. Because of the positive fit engagement of the abutting section 44 with the depression 50, however, even before the final, in the preferred example firmly bonded, fixing of the reflector assembly 36 at the sensor housing 12, the reflector assembly 36 is arrangeable only in discrete angular positions, in the present case in two angular positions, at the sensor housing 12.

As can be seen in FIG. 4, the securing ring 34 defines with the depression 50 a gap space 52 in which the projection 42 or more specifically the abutting section 44 of the reflector assembly 36 is accommodated. On the side of the protective layer 38 facing away from the reflector assembly 36 there is applied in the operational state a sealing layer likewise made from silicone, which fills the gap space 52. The sealing layer preferably exhibits a thickness of 10 μm.

The inner region of the reflector assembly 36 not obscured by the securing ring 34 and the section of the sensor housing 12 surrounding it when viewing the fluid side 36a along the housing axis G is the region of the reflector assembly 36 accessible to the analyte constituent of the measurement fluid in the measurement environment referred to in the descriptive introduction.

The region 36f of the signal side 36b lying radially within the aperture formed by the counter-abutting section 46 not obscured by the counter-abutting section 46 when viewing the signal side 36b along the housing axis G from the instrument region 18 is the entire area of the signal side 36b not obscured to the measurement radiation named in the descriptive introduction.

The securing ring 34 is initially accommodated in the sensor housing 12 with a press fit. After the arrangement of the securing ring 34 at the sensor housing 12, in addition to the already produced press fit the V-groove 53 which is discernible in particular in FIGS. 3 and 4 is filled by a weld seam and then the surface is smoothed by machining, for example through turning and/or milling and/or grinding and/or polishing.

Figure 5:
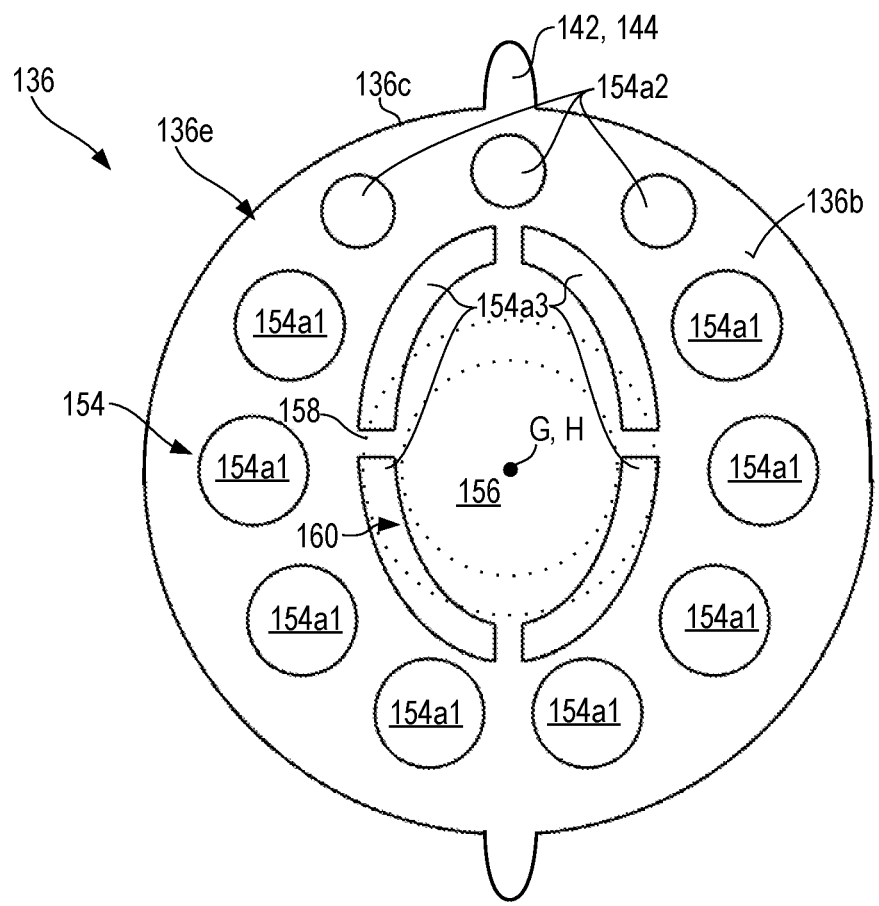

In FIG. 5 there is depicted a less preferred embodiment of a reflector assembly 136. Identical and functionally identical components as in the reflector assembly 36 of FIGS. 2 to 4 are labelled in FIG. 5 by the same reference symbols but increased numerically by 100. The embodiment of the reflector assembly 136 is elucidated only in so far as it differs from the hitherto described reflector assembly 36 of FIGS. 2 to 4. Otherwise, reference is made to the above description of the reflector assembly 36 for elucidating the reflector assembly 136.

FIG. 5 shows the reflector assembly 136 without polymer matrix and protective layer, i.e., only the component which on the signal side 136b facing towards the observer of FIG. 5 reflects the measurement radiation arriving at it.

The reflector assembly 136 exhibits in its reflective main region 136e, from which the projections 142 protrude as the abutting section of 144, passages 154 which completely penetrate through the reflector assembly 136 in the thickness direction which is orthogonal to the drawing plane of FIG. 5. The passages 154 thus reach from the signal side 136b which in FIG. 5 faces towards the observer all the way to the fluid side 136a which faces away from the observer of FIG. 5.

The passages 154 serve to render the reflector assembly 136 permeable to the analyte constituent to be detected by the sensor assembly 10, such that it can diffuse from the measurement environment M through the layers: sealing layer and protective layer 38 which are permeable to the analyte constituent, through the passages 154 into the polymer matrix 40. When the measurement environment M no longer contains measurement fluid or the measurement fluid no longer contains analyte constituent, the analyte constituent diffuses back from the polymer matrix 40 into the measurement environment M. A concentration difference of the analyte constituent between its fraction in the measurement fluid in the measurement environment M and its fraction in the polymer matrix 40 is the driver of the diffusion process, which ends when equilibrium prevails between the concentration of analyte constituent in the polymer matrix 40 and the concentration of analyte constituent in the measurement environment M.

The passages 154 at the reflector assembly 136 exhibit different shapes and moreover are distributed heterogeneously over the area of the reflector assembly 136, more precisely over its main region 136e.

Thus, the reflector assembly 136 exhibits a plurality, in the present example eight, of circular passages 154a1 with a larger diameter and exhibits a plurality, in the present example three, of circular passages 154a2 with a smaller diameter. These circular passages 154a1 and 154a2 are arranged in the depicted example in the vicinity of the edge region 136c of the reflector assembly 136, approximately following the edge region 136c.

The passages 154a1 with the larger diameter and therefore larger passage cross-sectional area can exhibit a diameter of for example 0.9 to 1.2 mm. The passages 154a2 with the smaller diameter and therefore smaller passage cross-sectional area can exhibit a diameter of for example 0.5 to 0.8 mm.

At a shorter distance from the housing axis G than the circular passages 154a1 and 154a2 there are situated as an example four slit-like passages 154a3 with a curvilinear course. By way of example, the four slit-like passages 154a3 are arranged in such a way that their slit area follows an ellipse. The slit-like passages 154a3 do not have to be curvilinear or can be curved other than is depicted in FIG. 5.

Figure 9:
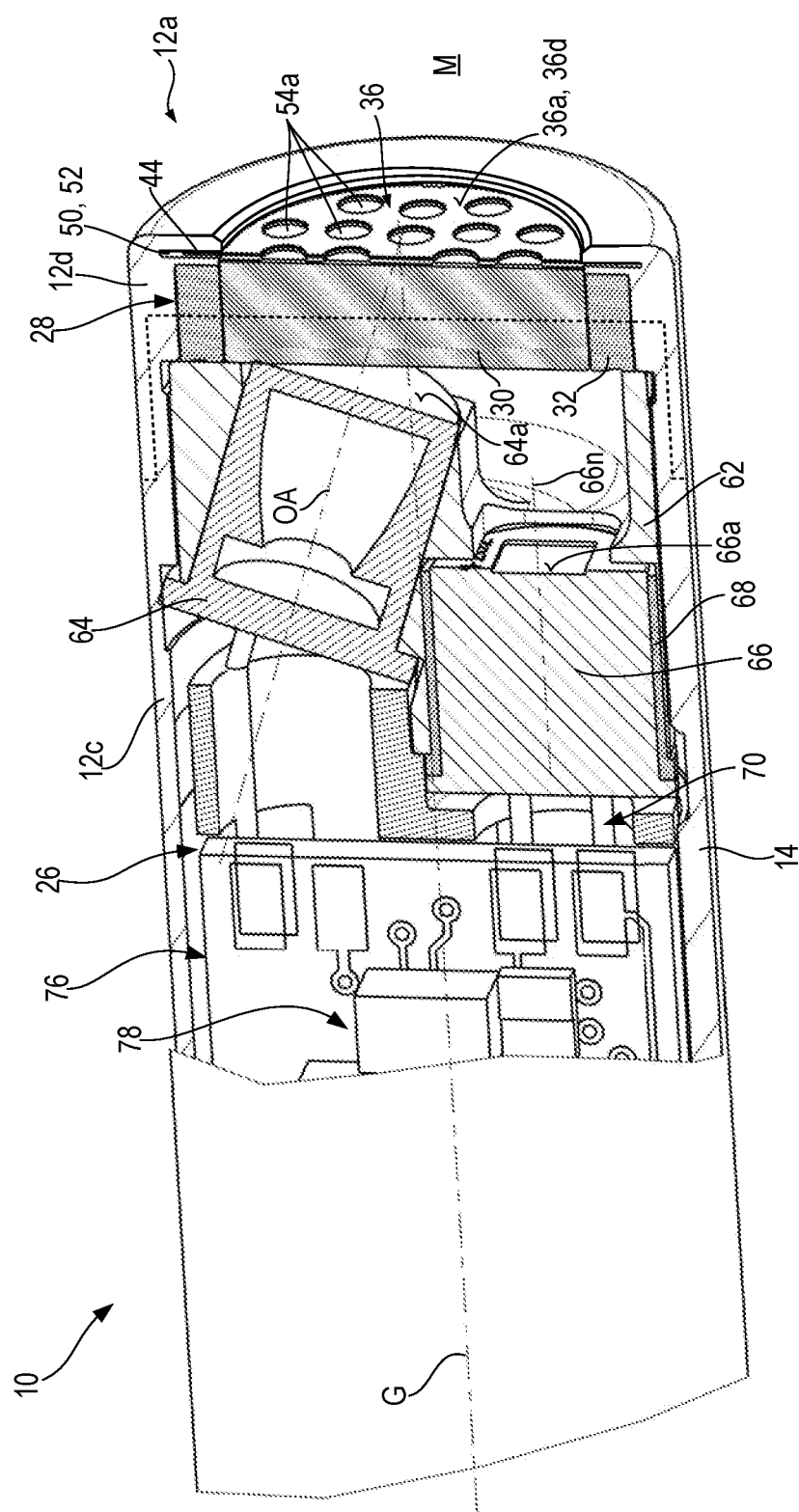

In a central region 156 whose midpoint is both the midpoint of the circular main region 136e and of the region not obscured to measurement radiation and also the impingement point H of an optical axis OA of the radiation source 64 (s. FIG. 9) elucidated further below, there is no passage 154 arranged. In the central region 156, the reflector assembly 136 and its signal side 136*b* which reflects the measurement radiation are solidly configured in order to provide the largest possible reflective area where most of the measurement radiation emitted by the radiation source 64 impinges on the reflector assembly 136.

The radius of the region 156 about the housing axis G and/or the impingement point H as the case may be is a little less than a third of the radius of the region of the reflector assembly 136 not obscured to measurement radiation, such that the region 156 takes up a little more than 10% of the area of the region not obscured to measurement radiation. In this central region 156, the reflector assembly 186 is free from passages 154.

The circle 158 indicated by a dotted line forms together with the edge of the region 156 an annular space 160, which exhibits the same area as the region 156. As can be easily discerned in FIG. 5, the annular space 160 contains portions of the passages 154*a*3, such that the area portion of passage cross-sectional areas in the annular space 160 is greater by 100% than in the passage-free central region 156.

In the embodiment example of FIG. 5, the entire average cross-sectional area realized at the reflector assembly 136 thus lies outside the innermost central region 156, whose area fraction out of the region of the reflector assembly 136 not obscured to measurement radiation is at least 10%.

Through this configuration it is made sure that on the one hand sufficient passage cross-sectional area is provided at the reflector assembly 136 in order to achieve, under a change in the concentration of the analyte constituent in the measurement fluid in the measurement environment M, also a sufficiently rapid change in the concentration of the analyte constituent in the polymer matrix 40 through which the measurement radiation passes, reaching a new state of equilibrium, and at the same time in order to obtain a sufficiently high yield of reflected measurement radiation which can be detected by the detector device 66 (s. FIG. 9) in the instrument section 18.

Figure 6:
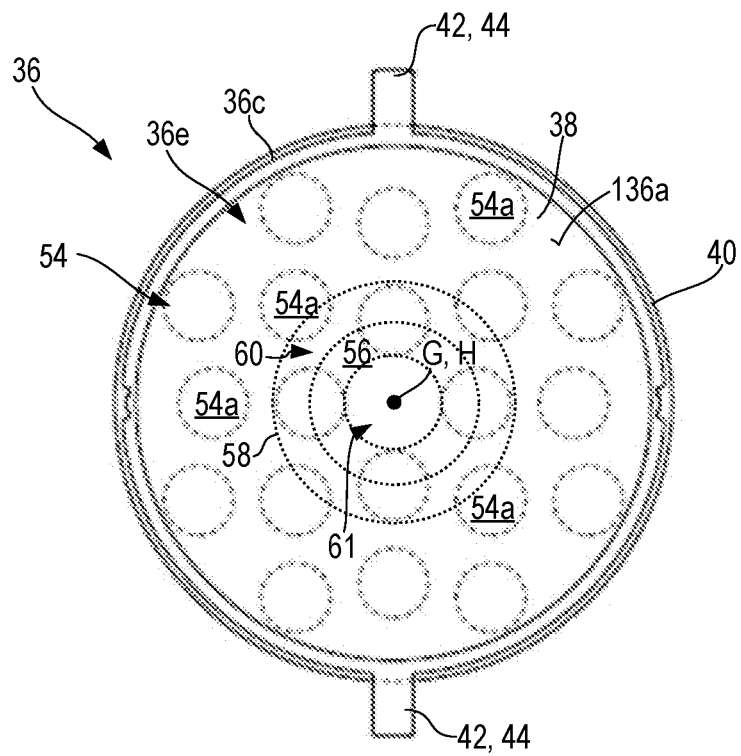

In FIG. 6 there is depicted the embodiment of the reflector assembly 36 of FIGS. 2 to 4, with the exception of the projections 42 which instead of a rounded shape as in FIG. 3 exhibit a rectangular shape in FIG. 6. When using the reflector assembly 36 with angular projections 42, the depression 50 is accordingly designed in a complementary manner and exhibits likewise an angular polyhedral boundary. In FIG. 6, identical and functionally identical components and component sections as in FIG. 5 are labelled by the same reference symbols, but decreased numerically by 100. The explanation of the embodiment of FIG. 5 applies also to the embodiment shown in FIG. 6, unless stated otherwise below.

The observer of FIG. 6 looks at the fluid side 36*a* of the reflector assembly 36, on which the protective layer 38 is applied. The polymer matrix 40 arranged on the opposite signal side projects radially slightly beyond the main region 36*e* of the reflector assembly 36.

In the embodiment of FIG. 6, the main region 36*e* of the reflector assembly 36 exhibits only one type of passages 54, namely circular passages 54*a*, which all exhibit the same diameter. The diameter equals approximately 0.8 to 1.1 mm, in the present case preferably 1.0 mm. The circular passages 54*a* are, however, distributed heterogeneously over the area of the main region 36*e* and/or in the region 36*f* of the reflector assembly 36 not obscured to measurement radiation. There exists a central region 56 which takes up a little more than 10% of the entire area of the region 36*f* not obscured to measurement radiation. In this central region 56, whose midpoint once again is the housing axis G and the impingement point H of the optical axis of the radiation source, there is situated slightly less than the passage cross-sectional area of two circular passages 54*a*. A total of four circular passages 54*a* are intersected by the edge of the central region 56, where in each case less than half of one of the intersected circular passages 54*a* lies within the central region 56.

The annular region 60 concentrically surrounding the central region 56 and equal to it in area, which also likewise takes up a little more than 10% of the entire area of the regions 36*f* not obscured to measurement radiation, contains in contrast a little less than the passage cross-sectional area of four circular passages 54*a*. Both the inner and the outer edge of the annular region 60 intersect four circular passages 54*a* each, whose partial areas lying within the annular region 60 add up to the slightly less than four passage cross-sectional areas of the circular passages 54*a*. Consequently, the central region 56 exhibits an approximately 50% smaller fraction of the passage cross-sectional area across its entire areal extent than the concentric annular region 60 surrounding it.

As FIG. 6 further shows, there also exists at the reflector assembly 36 a central passage-free region 61 lying in the region 56, whose midpoint is the housing axis G and/or the impingement point H of the optical axis of the radiation source as the case may be, and whose area is at least 30% greater than the average passage cross-sectional area of a passage 54*a* of the reflector assembly 36.

Figure 7:
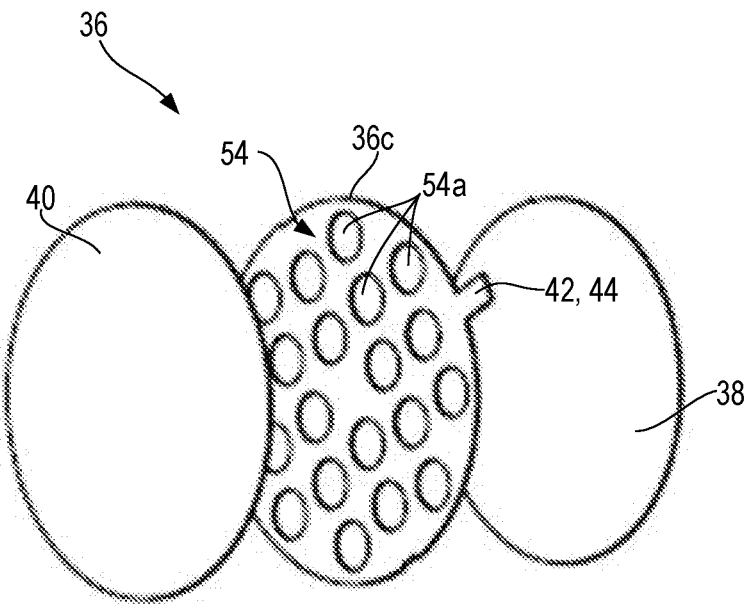

FIG. 7 shows an exploded view of the reflector assembly 36 of FIG. 6, i.e., with the thinner and smaller-diameter protective layer 38 and the thicker and larger-diameter polymer matrix 40 each removed from the reflector assembly 36. The circular passages 54*a* are filled with material of the polymer matrix 40 and/or of the protective layer 38.

Figure 8:
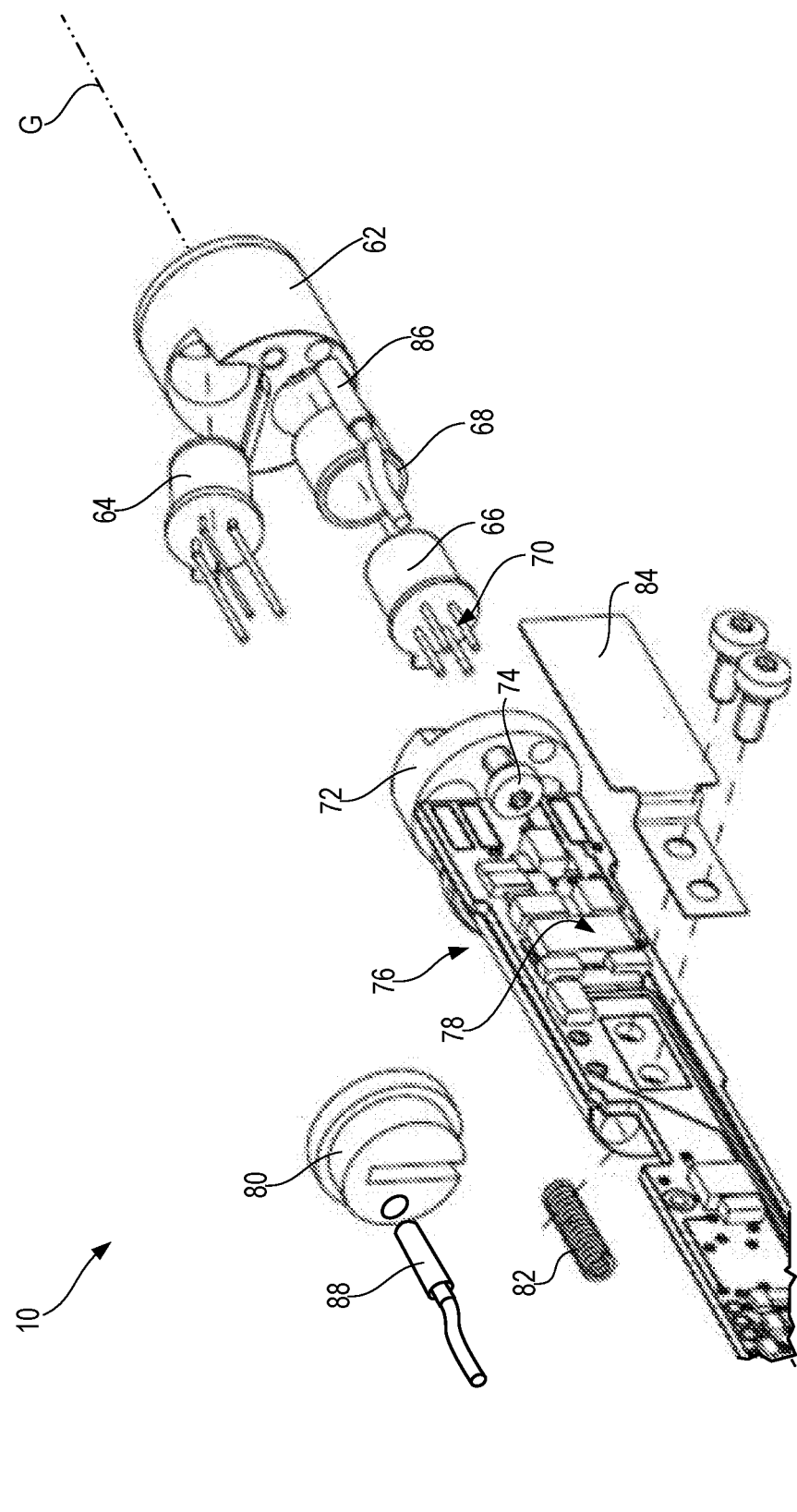

In FIG. 8 there is depicted the part of the components arranged in the instrument section 18 in the interior of the sensor housing 12 nearest to the barrier arrangement 28.

Closest to the barrier arrangement, which is not depicted in FIG. 8, is a holder 62, preferably from metal, in which the radiation source 64 and the detector device 66 are arranged facing towards the barrier arrangement 28 lying beyond the holder 62.

The radiation source 64 can for example be an LED radiating in the infrared wavelength region. The detector device 66 can exhibit an infrared-sensitive CCD field 66*a* (s. FIG. 9).

For thermal insulation of the detector device 66 with respect to the radiation source 64 which also acts as a heat source, the detector device 66 is surrounded by a casing 68 made from a synthetic, in particular from PEEK. The casing 68 is configured in a cylindrical or conical and/or frusto-conical shape as the case may be, and is open on both axial sides such that measurement radiation reflected by the reflector assembly 36 can irradiate the front of the detector device 66 and such that on the back of the detector device 66 its detection signals can be conducted away from the detector device 66 via lines 70.

On the side of the holder 62 facing away from the barrier arrangement 28 there is arranged a seating component 72 whose front face facing towards the holder along the housing axis G is configured at least section-wise to be complementary to the back of the holder 62 facing towards the seating component 72 through which the radiation source 64 and the detector device 66 are inserted into the holder. The complementary configuration of these surfaces ensures that the holder 62 can be arranged only in one particular relative position at the seating component 72. The holder 62 can be secured at the seating component 72 via screws 74.

On the side of the seating component 72 facing away from the holder 62 there protrudes a circuit board 76 on which control and signal processing electronics 78 are arranged for controlling the radiation source 64 and the detector device 66 and for evaluating or partly evaluating detection signals of the detector device 66.

The circuit board 76 is stabilized at the sensor housing 12 which is not depicted in FIG. 8 via a further seating component 80 and pretensioned towards the barrier arrangement 28 by means of a compression spring 82.

A part of the control and/or signal processing electronics 78 can be protected against heat impact by a protective plate 84.

The holder 62 carries a radiation module temperature sensor 86, which detects a temperature of the sensor assembly 10 in the region of the holder 62 with the radiation module, comprising the radiation source 64 and the detector device 66, and transmits it to the control and/or signal processing electronics 78.

The further seating component 80 accommodates an electronic temperature sensor 88 which detects a temperature of the sensor assembly 10 in the region of the control and/or signal processing electronics and outputs it to these electronics. Consequently, the control and/or signal processing electronics 78 can compensate for the detection signals received from the detector device 66 both in regard to the temperature prevailing in the region of the detector device 66 and in regard to the temperature prevailing at the control and/or signal processing electronics 78 themselves and thus output an especially accurate detection signal.

In FIG. 9 there is depicted the sensor assembly 10 in a partial section in the region of its longitudinal measurement end 12a. With the help of the reference symbols in FIG. 9, the components depicted there and already elucidated above can be readily identified.

In FIG. 9 it can be discerned that the radiation source 64 with its optical axis OA is depicted as tilted relative to the housing axis G. Moreover, the radiation exit surface 64a of the radiation source 64 is arranged nearer to the barrier arrangement 28 than a radiation-sensitive detector surface 66a of the detector device 66. The radiation exit surface 64a can even touch the sapphire glass 30 of the barrier arrangement 28.

A normal 66n to the detector surface 66a proceeds in the depicted example in parallel to the housing axis G. The optical axis OA of radiation source 64 is thus more strongly tilted with respect to the housing axis G than the normal 66n to the detector surface 66a.

The optical axis OA of the radiation source 64 arrives at the central region 56 indicated in FIG. 6, preferably exactly at its center, on the reflective signal side 36b of the reflector assembly 36. From there a considerable part of the incoming measurement radiation is reflected to the detector surface 66a. The analyte constituent, preferably $CO_2$, in the polymer matrix 40 arranged between the sapphire glass 30 and the reflector assembly 36 absorbs the measurement radiation emitted by the radiation source 64 as a function of its concentration in the polymer matrix 40. In order to be able to ascertain the extent of absorption of the measurement radiation, the radiation source 64 also emits reference radiation with a different wavelength than that of the measurement radiation, which is not absorbed by the analyte constituent in the polymer matrix 40 and also remains otherwise unaffected. From the ratio, for example, of the intensities of the reflected measurement radiation detected by the detector device 66 on the one hand and the detected reflected reference radiation on the other, the control and/or signal processing electronics 78 can determine the extent of absorption in the polymer matrix 40 and based on that the concentration of analyte constituent in the polymer matrix 40.

The wall thickness of the tubular component 14 can be configured thinner in the part of the instrument section 18 lying nearest to the barrier arrangement 28 as shown in FIG. 9, than in a section of the tubular component 14 located further away from the barrier arrangement 28.

In FIG. 9 there is depicted with a dashed line a separating surface which subdivides the longitudinal measurement end 12a of the sensor device 10 depicted in FIG. 9 into an instrument-side housing part 12c and a fluid-side housing part 12d, where the fluid-side housing part 12d is arranged detachably at the instrument-side housing part 12c, for instance is plugged on or screwed on. The specimen section 16 is then completely part of the fluid-side housing part 12d. The divided barrier arrangement 28 continues to protect with its section arranged firmly at the instrument-side housing part 12c the interior space 26 of the sensor assembly 10 against external effects. The fluid-side housing part 12d can then be replaced at the end of its service life, whereas the rest of the sensor assembly 10 can continue to be used.

In FIG. 9 there is shown the front face of the longitudinal measurement end 12a of the sensor assembly 10 fully finished, i.e., with securing ring welded to the tubular component 14, where the welding seam is polished flat.

Figure 10:
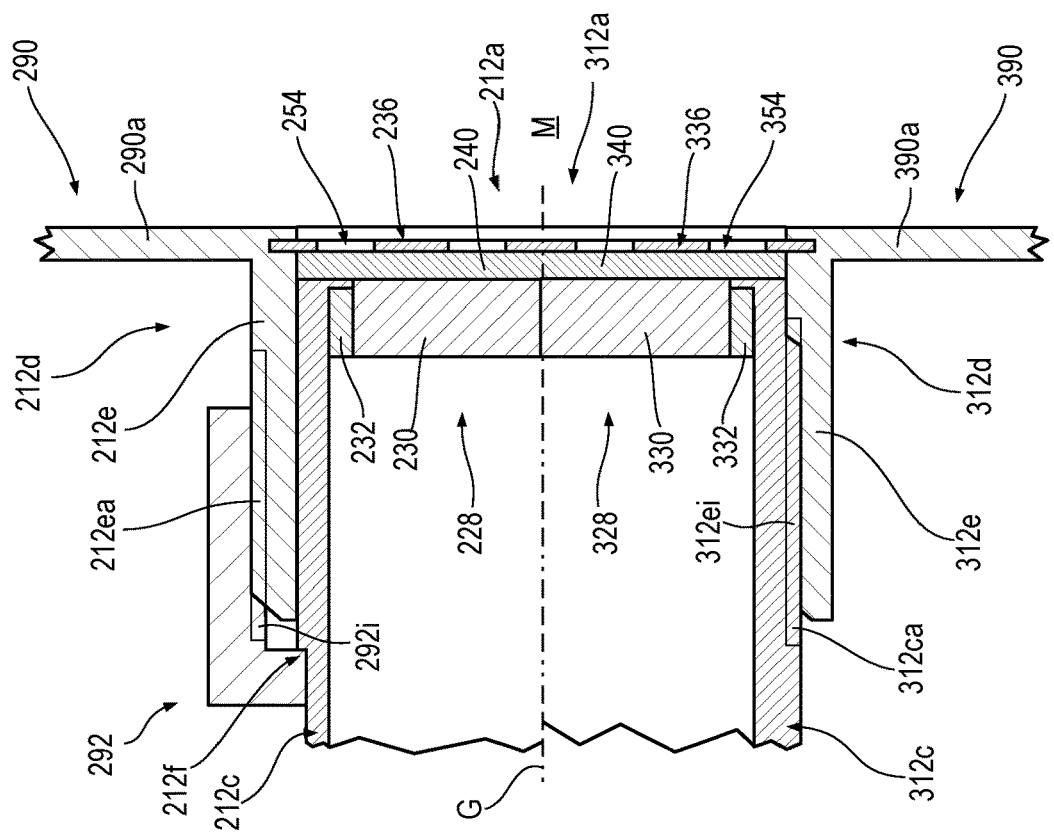

In FIG. 10 there are depicted two slightly different embodiments of a fluid-side housing part 212d, top, and 312d, bottom, in a rough schematic longitudinal section. Identical and functionally identical components and component sections as in the preceding embodiments are labelled by the same reference symbols in the top half of the depiction, but in the numerical range from 200 to 299. Identical and functionally identical components and component sections as in the preceding embodiments are labelled by the same reference symbols in the bottom half of the depiction, but in the numerical range from 300 to 399. The embodiments of FIG. 10 are described below only in so far as they differ from the preceding description. The preceding description serves otherwise also for elucidating the embodiments of FIG. 10.

The fluid-side housing part 212d is made in the depicted embodiment example from metal, in particular from stainless steel, or from a synthetic, namely integrally with a wall 290a of a housing 290 for accommodating or conducting measurement fluid which is to be detected metrologically with the sensor assembly according to the invention.

Alternatively, the fluid-side housing part 212d can be fabricated separately from the wall 290a and firmly bonded with it, preferably through welding.

The fluid-side housing part 212d comprises in the depicted embodiments at the longitudinal measurement end 212a the reflector assembly 236 and the polymer matrix 240, if desired also the protective layer not depicted in FIG. 10, preferably in accordance with the above description. However, the fluid-side housing part 212d comprises no part of the barrier arrangement, which is arranged completely at the instrument-side housing part.

The fluid-side housing part 212d exhibits a sleeve section 212e projecting away from the longitudinal measurement end 212a towards an instrument-side housing part 212c still to be arranged.

In the embodiments shown in FIG. 10 in the top half of the depiction, the sleeve section 212e exhibits an external thread 212ea onto which a protective cap 291 with internal thread 291i is screwed.

Alternatively, as shown in the bottom half of the depiction of FIG. 10, the sleeve section 312e can exhibit an internal thread 312ei to which a protective cap 391 provided correspondingly with an external thread is screwed. The protective cap 291, which encompasses the sleeve section 212e radially outside with respect to the housing axis G in the region of the fluid-side housing part 212d, protects the sleeve section 212e and the fluid-side housing part 212d better against for example dirt ingress into the inner region of the sleeve section 212e than is the case at the sleeve section 312e with internal thread 312ei, where in the most unfavorable case dirt can accumulate in the gap between the axial front face at the longitudinal end distal from the measurement environment M and the protective cap 391. For that the bottom embodiment in FIG. 10 requires less installation space, since fixing sections of the protective cap 391, such as for instance the internal thread 391i and the cap sleeve carrying it, are situated inside the sleeve section 312e.

The screw axis of the protective cap 291 and 391 respectively is in both cases the housing axis G in the region of the fluid-side housing part 212d and 312d respectively.

Figure 11:
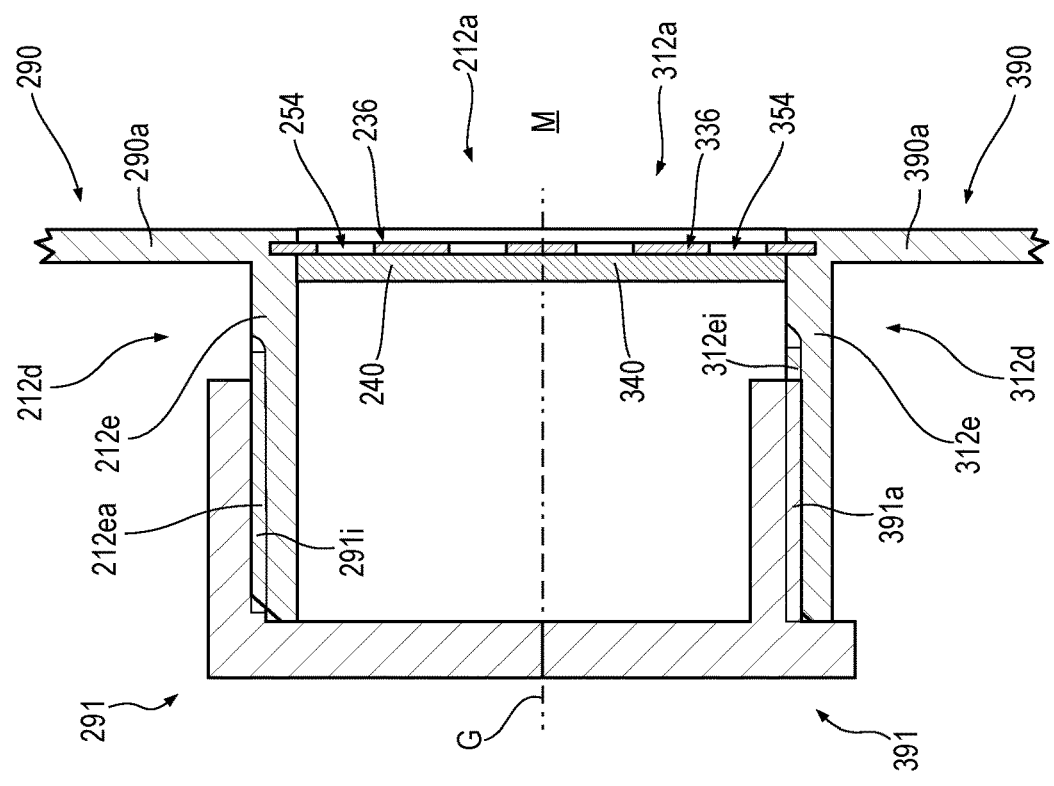

In FIG. 11 there are depicted the same two embodiments of a fluid-side housing part 212d and 312d respectively as in FIG. 10. However, now the respective protective cap 291 and 391 as the case may be is removed. Instead of the protective cap 291 and 391 respectively, now the instrument-side housing part 212c in the top half of the depiction and 312c in the bottom half of the depiction respectively is connected, more precisely screwed, to the fluid-side housing part 212d and 312d respectively. The screw axis in both cases is the housing axis G.

For better clarity, the depiction of the inner region of the instrument-side housing parts 212c and 312c is omitted in FIG. 11. It corresponds essentially to the depiction of FIG. 9.

As already indicated above, in the embodiment examples of FIG. 11 the entire barrier arrangement 228 and 328 respectively is arranged at the instrument-side housing part 212c and 312c respectively in the manner described above. With the connection of the instrument-side housing part 212c and 312c respectively with the assigned fluid-side housing part 212d and 312d respectively, the barrier arrangement 228 and 328 respectively is moved up to the polymer matrix 240 and 340 respectively for abutment against it.

The instrument-side housing part 212c shown in the top half of the depiction of FIG. 11 exhibits its connection with the fluid-side housing part 212d a cap nut 292 with internal thread 292i. The cap nut 292 abuts against a set-off 212f of the instrument-side housing part 212c and can thereby in screw engagement with the external thread 212ea of the sleeve section 212e exert an axial force on the instrument-side housing part 212c in the direction towards the measurement environment M and the longitudinal measurement end 212a respectively.

Given an advantageous free play adjustment between the outer surface of the instrument-side housing part 212c and the inside of the sleeve section 212e, the screw engagement between the cap nut 292 and the sleeve section 212e can be released without thereby the instrument-side housing part 212c being necessarily removed from the fluid-side housing part 212d. Even after releasing the screw engagement between the cap nut 292 and the sleeve section 212e, the instrument-side housing part 212c can be held frictionally engaged at the fluid-side housing part 212d, such that it has to be manually removed by the user from the fluid-side housing part 212d. Since the instrument-side housing part 212c has to be relatively rotatable relative to the cap nut 292, the instrument-side housing part 212c can be arranged in an arbitrary rotational position relative to the fluid-side housing part 212d.

In the embodiment of the instrument-side housing part 312c in the bottom half of the depiction of FIG. 11, the instrument-side housing part 312c exhibits an external thread 312ca with which the instrument-side housing part 312c can be screwed into the internal thread 312ei of the sleeve section 312e of the fluid-side housing part 312d. In contrast to the embodiment top half of the depiction of FIG. 11, the relative position between the instrument-side housing part 312c and the fluid-side housing part 312d depends on the screw engagement of the housing parts with one another. Consequently, the relative rotational position between the instrument-side housing part 312c and the fluid-side housing part 312d cannot be chosen freely.

Figure 12:
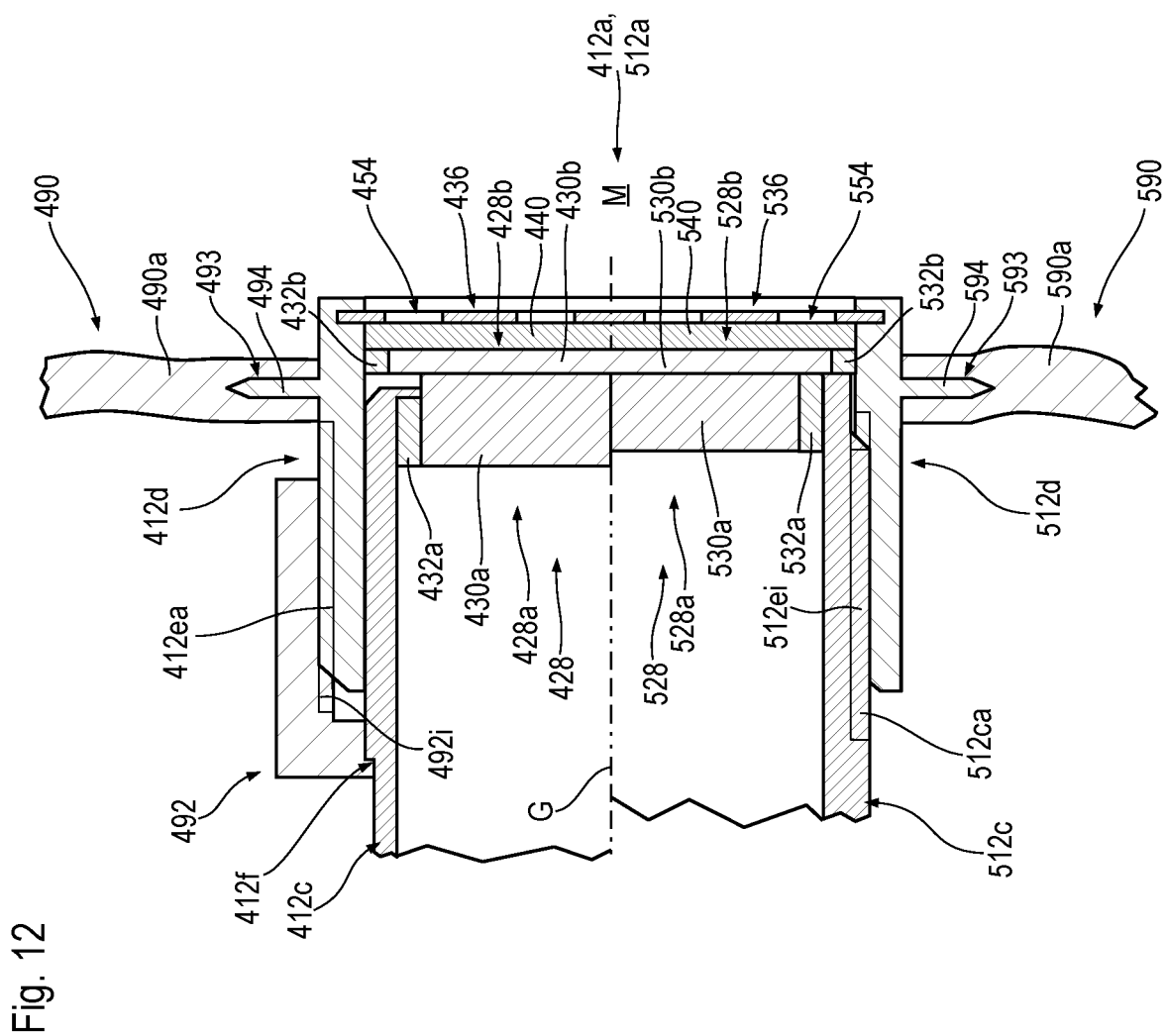

In FIG. 12 there are depicted two slightly different embodiments of a fluid-side housing part 412d, top, and 512d, bottom, in a rough schematic longitudinal section. Identical and functionally identical components and component sections as in the preceding embodiments are labelled by the same reference symbols in the top half of the depiction, but in the numerical range from 400 to 499. Identical and functionally identical components and component sections as in the preceding embodiments are labelled by the same reference symbols in the bottom half of the depiction, but in the numerical range from 500 to 599. The embodiments of FIG. 12 are described below only in so far as they differ from the preceding description. The preceding description serves otherwise also for elucidating the embodiments of FIG. 12.

A first difference between the two embodiments of FIG. 12 and the preceding embodiments of FIG. 11 lies in the fact that the barrier arrangement 428 and 528 respectively is not arranged completely in the instrument-side housing part 412c and 512c respectively, but rather is arranged with an instrument-side barrier arrangement part 428a and 528a respectively in the instrument-side housing part 412c and 512c respectively and with a fluid-side barrier arrangement part 428b and 528b respectively in the fluid-side housing part 412d and 512d respectively. Each barrier arrangement part is bonded firmly with the housing part carrying it. Accordingly, the instrument-side barrier arrangement part 428a and 528a respectively exhibits an instrument-side sapphire glass disc part 430a and 530a respectively which by means of an instrument-side cement section 432a and 532a respectively is bonded with the instrument-side housing part 412c and 512c respectively. Likewise, the fluid-side barrier arrangement part 428b and 528b respectively exhibits a fluid-side sapphire glass disc part 430b and 530b respectively which by means of a fluid-side cement section 432b and 532b respectively is bonded with the fluid-side housing part 412d and 512d respectively.

The essential difference between the embodiments of FIG. 12 and the preceding embodiments, however, consists in the fact that each fluid-side housing part 412d and 512d respectively is not firmly bonded with the wall 490a and 590a respectively of the housing 490 and 590 respectively but rather is connected with a positive fit.

The wall 490a and 590a respectively is configured as a flexible polymer wall. The fluid-side housing part 412d and 512d respectively which as before is made from metal or from a stiffer synthetic than the polymer wall, exhibits at its outside an anchoring structure 493 and 593 respectively, which is embedded in the flexible polymer wall 490*a* and 590*a* respectively. The anchoring structure 493 can for example be configured as an all-around encircling disc 494 protruding radially outward with respect to the housing axis G. The anchoring structure 593 can comprise a plurality of spike projections 594 arranged at a distance from one another in the circumferential direction about the housing axis A and protruding ray-like radially outward or be formed by the spike projections 594. The allocation here is merely by way of example. Alternatively, the anchoring structure 493 can exhibit the ray-like protruding spike projections 594 and the anchoring structure 593 the all-around encircling disc 494.

With the positive-fit connection depicted in FIG. 12 of fluid-side housing part 412*d* and 512*d* respectively and housing wall 490*a* and 590*a* respectively, components from completely different materials can also be connected with one another completely securely and tightly.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A spectroscopic sensor assembly for detecting at least one predetermined analyte constituent of a measurement fluid, where the sensor assembly comprises:
a sensor housing with an instrument section and a specimen section,
a radiation source which is arranged in the instrument section and is configured to emit in the direction towards the specimen section electromagnetic measurement radiation which interacts with the at least one predetermined analyte constituent,
a detector device which is arranged in the instrument section and is configured to detect electromagnetic radiation radiating in the direction from the specimen section,
a barrier arrangement which is transparent to the measurement radiation and impermeable to the at least one predetermined analyte constituent, where the barrier arrangement is arranged between the instrument section and the specimen section,
a polymer matrix which is arranged in the specimen section and is configured to take up and to release again the at least one analyte constituent,
a reflector assembly which is arranged in the specimen section with a signal side facing towards the polymer matrix and towards the barrier arrangement and with a fluid side opposite to the signal side,
where the reflector assembly exhibits at least one passage penetrating through it through which during normal measurement operation of the sensor assembly there takes place an exchange of the at least one analyte constituent between an external measurement environment on the fluid side of the reflector assembly which during normal measurement operation contains the measurement fluid and the polymer matrix situated on the signal side of the reflector assembly, where the reflector assembly is configured and is arranged to reflect measurement radiation radiating onto its signal side from the instrument section through the polymer matrix back in the direction towards the instrument section,
wherein the sensor assembly exhibits a spacing-securing means different from the polymer matrix which is configured to prevent an approach of the reflector assembly to the barrier arrangement.

2. The sensor assembly according to claim 1, wherein the spacing-securing means exhibits an abutting section at the reflector assembly which is in abutting engagement which prevents an approach of the abutting section to the barrier arrangement with a counter-abutting section connected rigidly with the sensor housing.

3. The sensor assembly according to claim 2, wherein the reflector assembly exhibits at least in part a disc-like shape, where the abutting section is configured in an edge region of the disc-like reflector assembly.

4. The sensor assembly according to claim 3, wherein at least part of the edge region of the reflector assembly is accommodated in a gap space which towards the barrier arrangement is bounded by the counter-abutting section and away from the barrier arrangement by a fixing component connected rigidly with the sensor housing.

5. The sensor assembly according to claim 1, wherein the spacing-securing means exhibits a supporting section at the reflector assembly which is supported physically at the barrier arrangement.

6. The sensor assembly according to claim 1, wherein the spacing-securing means exhibits a force-fitted and/or firmly bonded engagement of a retaining section of the reflector assembly with a counter-retaining section of the sensor housing.

7. The sensor assembly according to claim 1, wherein polymer material extends from the barrier arrangement continuously up to the reflector assembly.

8. The sensor assembly according to claim 7, wherein the polymer material fills completely a hollow space which is bounded by the barrier arrangement, by the reflector assembly, and by a section of the sensor housing or of a component accommodated at the sensor housing situated between the barrier arrangement and the reflector assembly.

9. The sensor assembly according to claim 1, wherein both on the signal side and on the fluid side there is situated polymer material, where the polymer matrix arranged on the signal side covers a larger area of the reflector assembly and/or exhibits greater thickness and/or exhibits higher thermal resistance than a layer of polymer material applied onto the fluid side.

10. The sensor assembly according to claim 1, wherein the reflector assembly exhibits a plurality of passages penetrating through the reflector assembly, where the passages, considered over the area of the fluid side accessible to the at least one analyte constituent and/or over the region of the signal side of the reflector assembly not obscured to measurement radiation, are configured and/or arranged with a homogeneous distribution.

11. The sensor assembly according to claim 10, wherein the reflector assembly exhibits passages with different passage cross-sectional areas and/or with different passage cross-sectional shapes, and/or that the area of the fluid side accessible to the at least one analyte constituent and/or the region of the signal side not obscured to the measurement radiation exhibits surface regions with differing passage densities.

12. The sensor assembly according to claim 11, wherein the reflector assembly exhibits in a circular region which as a midpoint contains an impingement location at which an optical axis outbound from the radiation source impinges on the signal side and whose area content equals at least 10%, preferably at least 20%, of the area of the region of the signal side not obscured to measurement radiation, an area fraction of passage cross-sectional areas out of the area of the circular region which is smaller by at least 20% than in an annular region with the same area surrounding the circular region.

13. The sensor assembly according to claim 11, wherein the region of the signal side not obscured by the sensor housing exhibits in a circular region, which as midpoint has the area center of the region of the signal side not obscured to measurement radiation and whose area content equals at least 10%, preferably at least 20%, of the area of the region of the signal side not obscured to measurement radiation, an area fraction of passage cross-sectional areas out of the area of the circular region which is smaller by at least 20% than in an annular region with the same area surrounding the circular region.

14. The sensor assembly according to claim 11, wherein in the region of the signal side not obscured to measurement radiation there exists a circular region; whose area content equals at least 1.3 times the mean cross-sectional area of the passages in the accessible area and which is free from a passage cross-sectional area.

15. The sensor assembly according to claim 1, wherein the detector device exhibits a detector surface sensitive to measurement radiation, where a radiation exit surface of the radiation source is situated nearer to the barrier arrangement than the detector surface and/or where the optical axis of the radiation source is tilted with respect to a housing axis along which the sensor housing extends more than a normal to the detector surface.

16. The sensor assembly according to claim 1, wherein the radiation source and the detector device are accommodated in a common holder in the instrument section.

17. The sensor assembly according to claim 16, wherein between the detector device and the holder there is arranged a thermally insulating layer.

18. The sensor assembly according to claim 16, wherein the holder carries a radiation module temperature sensor for detecting a temperature in the region of a radiation module exhibiting the radiation source and the detector device.

19. The sensor assembly according to claim 1, wherein the barrier arrangement is divided into an instrument-side barrier arrangement part and a fluid-side barrier arrangement part and the sensor housing is subdivided into an instrument-side housing part carrying the instrument-side barrier arrangement part and a fluid-side housing part carrying the fluid-side barrier arrangement part, where the fluid-side barrier arrangement part together with the polymer matrix and the reflector assembly are accommodated at the fluid-side housing part and normally coupled detachably with the instrument-side housing part.

20. The sensor assembly according to claim 1, wherein in the instrument section of the sensor housing there are arranged control and/or signal processing electronics for controlling the radiation source and/or the detector device and/or for evaluating detection signals of the detector device.

21. The sensor assembly according to claim 20, wherein in the instrument section there is accommodated an electronic temperature sensor for detecting a temperature in the region of the control and/or signal processing electronics.

22. The sensor assembly according to claim 20, wherein the wall thickness of the sensor housing in the region of the accommodated control and/or signal processing electronics is greater than in the region of the accommodated radiation source and of the accommodated detector device.

23. The sensor assembly according to claim 1, wherein the barrier arrangement exhibits a sapphire glass disc which preferably is firmly bonded with the sensor housing, especially preferably through a fused joint.

* * * * *